US011237004B2

(12) United States Patent
Prasser et al.

(10) Patent No.: US 11,237,004 B2
(45) Date of Patent: Feb. 1, 2022

(54) LOG TRAJECTORY ESTIMATION FOR GLOBALLY CONSISTENT MAPS

(71) Applicant: UATC, LLC, San Francisco, CA (US)

(72) Inventors: David Prasser, Pittsburgh, PA (US); Robert Zlot, Pittsburgh, PA (US); Peter Hansen, Pittsburgh, PA (US); Jennifer Joyce Padgett, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 135 days.

(21) Appl. No.: 16/366,561

(22) Filed: Mar. 27, 2019

(65) Prior Publication Data

US 2019/0301873 A1  Oct. 3, 2019

Related U.S. Application Data

(60) Provisional application No. 62/797,638, filed on Jan. 28, 2019, provisional application No. 62/648,541, filed on Mar. 27, 2018.

(51) Int. Cl.
*G01C 21/32* (2006.01)
*G06T 17/05* (2011.01)
(Continued)

(52) U.S. Cl.
CPC ............... *G01C 21/32* (2013.01); *G06T 7/74* (2017.01); *G06T 17/05* (2013.01); *G05D 1/027* (2013.01);
(Continued)

(58) Field of Classification Search
CPC .......... G01C 21/32; G06T 17/05; G06T 7/74; G06T 2207/30248; G06T 2207/10028;
(Continued)

(56) References Cited

U.S. PATENT DOCUMENTS

| 8,977,074 B1 | 3/2015 | Berent et al. |
| 10,599,150 B2 | 3/2020 | Graham et al. |

(Continued)

OTHER PUBLICATIONS

"U.S. Appl. No. 16/366,543, Non Final Office Action dated Jul. 19, 2021", 23 pgs.

*Primary Examiner* — Brian P Sweeney
(74) *Attorney, Agent, or Firm* — Schwegman Lundberg & Woessner, P.A.

(57) ABSTRACT

A georeferenced trajectory estimation system for vehicles receives trajectory data generated by a plurality of vehicle sensors and fixed reference points of previously generated maps and aligns geometry data for a geographic region and trajectory data from the received data from different map builds. The trajectory data from respective map builds is aligned with fixed reference points of previously generated maps to generate a map of the geographic region. The received map data may include submap or spatially indexed data that is used to provide estimates of where a vehicle in an unmapped area is located by generating a series of pose estimates relating back to a fixed reference point in a previously mapped area. The resulting map expands the coverage of the existing map such that old and new map data is in a common consistent reference frame whereby the map may be built incrementally while ensuring global consistency.

22 Claims, 11 Drawing Sheets

(51) Int. Cl.
*G06T 7/73* (2017.01)
*G05D 1/02* (2020.01)

(52) U.S. Cl.
CPC ......... *G05D 1/0212* (2013.01); *G05D 1/0231* (2013.01); *G05D 1/0242* (2013.01); *G05D 1/0255* (2013.01); *G05D 1/0257* (2013.01); *G05D 2201/0213* (2013.01); *G06T 2207/10028* (2013.01); *G06T 2207/30248* (2013.01)

(58) Field of Classification Search
CPC ......... G05D 2201/0213; G05D 1/0231; G05D 1/0255; G05D 1/0242; G05D 1/0257; G05D 1/027; G05D 1/0212
See application file for complete search history.

(56) References Cited

U.S. PATENT DOCUMENTS

| | | |
|---|---|---|
| 2009/0292468 A1 | 11/2009 | Wu et al. |
| 2015/0123995 A1 | 5/2015 | Zavodny et al. |
| 2018/0045519 A1* | 2/2018 | Ghadiok ............... G06K 9/2054 |
| 2018/0173242 A1 | 6/2018 | Lalonde et al. |
| 2018/0188039 A1* | 7/2018 | Chen ..................... B60W 40/06 |
| 2018/0188043 A1 | 7/2018 | Chen et al. |
| 2018/0367871 A1 | 12/2018 | Zeng |
| 2019/0302801 A1 | 10/2019 | Zlot et al. |
| 2020/0103236 A1 | 4/2020 | Adams et al. |

\* cited by examiner

LOG TRAJECTORY ESTIMATION FOR GLOBALLY CONSISTENT MAPS

CROSS-REFERENCE TO RELATED APPLICATIONS

The present application claims priority to U.S. Provisional Patent Application No. 62/797,638, filed Jan. 28, 2019, and entitled "Log Trajectory Estimation for Globally Consistent Maps." The present application is also a continuation-in-part of U.S. patent application Ser. No. 16/366,543, filed Mar. 27, 2019, and entitled "Georeferenced Trajectory System," which, in turn, claims priority to U.S. Provisional Patent Application No. 62/648,541, filed Mar. 27, 2018. The contents of these patent applications are hereby incorporated by reference.

TECHNICAL FIELD

The disclosure herein is directed to devices, systems, and methods for providing globally consistent maps from trajectory data when developing maps for an autonomous or semi-autonomous vehicle.

BACKGROUND

Autonomous vehicle technology typically relies on the fusion of sensor data to enable a computational control system of the autonomous vehicle to perform perception, prediction, motion planning, and vehicle control operations. A key aspect to autonomous vehicle systems is the continuous determination of the autonomous vehicle's state, which can include the vehicle's position, orientation, trajectory, velocity, etc. with respect to the world around it (e.g., in a common and/or local reference frame). These operations are referred to as localization operations, or the determination of the vehicle's pose. Various methods of localization require the use of a sensor suite, which can comprise any number and type of sensors, such as radar, LIDAR, cameras, sonar, infrared, satellite positioning systems, and inertial measurement unit sensors. Accurate localization can also be aided by preconstructed localization maps that contain detailed prior data of a geographical region in which the autonomous vehicle operates.

The generation of high fidelity localization maps from georeferenced trajectories over a series of time does not in general result in maps that are globally consistent. Graph-based maps—in which smaller components (or submaps) are defined in separate (but relatable) reference frames—may be sufficient for many tasks onboard an autonomous vehicle; however, the absence of global consistency across the trajectories used to generate the maps hinders many offline users that require or prefer global consistency for correctly consuming map data.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
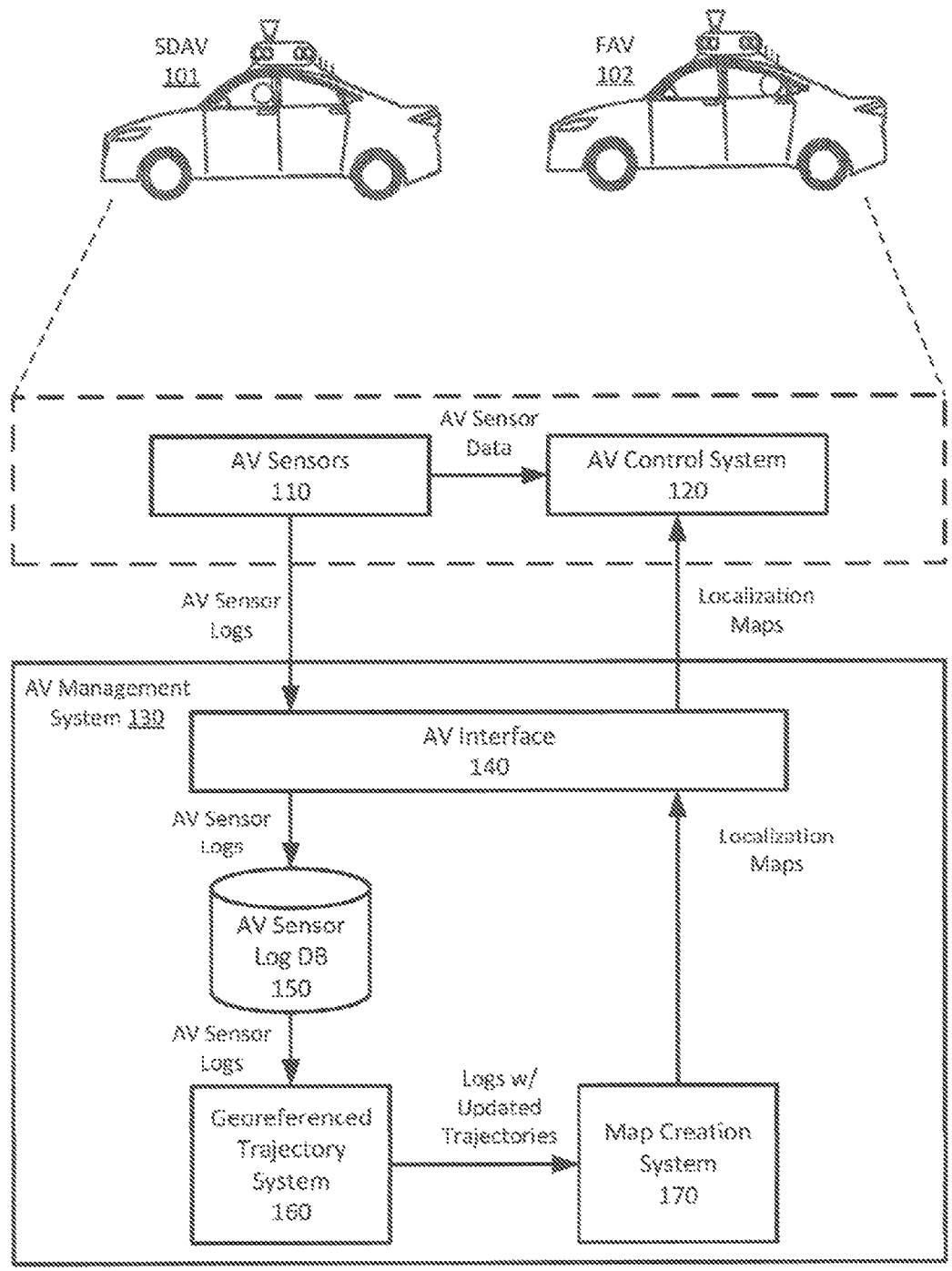
FIG. 1 is a block diagram illustrating autonomous vehicles in communication with an autonomous vehicle management system, according to examples described herein.

It should be understood at the outset that although an illustrative implementation of one or more embodiments are provided below, the disclosed systems and/or methods described with respect to FIGS. 1-10 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Overview

As described herein, an autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information. In an autonomous or semi-autonomous vehicle, an autonomous vehicle (AV) control system controls one or more of the braking, steering, or throttle of the vehicle. In a fully-autonomous vehicle, the AV control system assumes full control of the vehicle. In a semi-autonomous vehicle, the AV control system assumes a portion of the vehicle control, with a human user (e.g., a vehicle operator) still providing some control input.

In order to navigate its surrounding environment, an autonomous vehicle (AV) can include a perception sensor system generating sensor data used to build a sensor view of the environment. The perception sensor system can include any number of cameras (e.g., stereoscopic or monocular cameras), LIDAR sensors, sonar sensors, infrared sensors, radar, inertial measurement units (IMU), encoders (e.g., wheel speed encoders), and/or other types of proximity or imaging sensors. The control system can comprise one or more processors executing an instruction set that causes the control system to process a sensor view generated by the perception sensor system to perform object detection operations and autonomously operate the vehicle's acceleration, braking, and steering systems. In addition, the sensor data generated from the various AV sensors can be logged and uploaded to an AV management system.

To aid in navigating the environment, autonomous vehicles can also rely on preconstructed localization maps that contain detailed prior data. For example, the localization maps can encompass long stretches of highways, city road segments, and the like. In order to create and update these localization maps, the AV management system can use the sensor data that are collected and stored by a fleet of autonomous vehicles and/or human-driven vehicles. Accordingly, the map creation process takes sensor logs, or mapping logs, captured in a target geographic region as input. However, these logs should first be imbued with accurate and consistent trajectories so that the map creation process can subsequently produce the geometric models to which lanes, intersections, and other autonomy relevant map entities are registered. The map creation process generates new map geometry by identifying the time intervals of sensor logs for a region, registering the associated environment geometry data (e.g., LIDAR points) into a common coordinate frame, and generating a geometric model of the world in that region.

Multiple sets of log data for a single geographic region are combined to generate more accurate localization maps and fill in gaps that may exist in a single log due to obstructions such as other vehicles (either parked or moving), pedestrians, the space underneath the vehicle, etc. However, to be used for autonomous vehicle operation, localization for sensor logs should be relatively accurate within and across multiple logs to the level of centimeters/milliradians. Generating accurate geometric models relies on the reliability of the trajectories (i.e., sequence of poses) for each of the sensor logs. Repeated visits to the same region minutes or days apart, whether by the same vehicle or different vehicles, need corresponding pose estimates that accurately co-register sensor data such as LIDAR point clouds. Localization for sensor logs should also be globally accurate to the extent that crude road network information maps roughly to where it should within the created localization maps or submaps, and to the extent that reported global positions (in latitude/longitude) are sufficiently accurate for vehicle routing.

Localization mapping systems experience numerous technical challenges, including low-quality and unreliable global navigation satellite system (e.g., GPS, GLONASS, Beidou, and Galileo) data, especially in urban canyons, and the difficulty of aligning LIDAR in dynamic environments. Furthermore, accurate trajectories estimated independently per vehicle log are insufficient because the trajectories would only be accurate in their local coordinate frame. Therefore, each of the vehicle logs in a dataset should be jointly registered into a common coordinate frame, requiring cross-log registration of observed geometry. In addition, pose graph optimization on datasets of this size—many millions of nodes and edges—requires sophisticated techniques. Finally, the final trajectories should be not only accurate and coherent, but also consistent with existing map skeletons (extents from road networks) to within bounds acceptable to map production policies, which is a challenge since these skeletons are not directly observable from sensor data.

Among other advantages, a georeferenced trajectory estimation system such as described herein is able to produce trajectories uniformly more suited to map creation by using the same source sensor (e.g., LIDAR unit on a given AV) that generated the data to be co-registered to also help estimate the trajectory. In addition, aligning data across multiple logs early in the map creation process can average out systematic error from low quality GPS data.

While maps created from conventional trajectory estimation systems are sufficient for many tasks onboard an autonomous vehicle, the lack of global consistency in such maps may hinder many offline users that require or prefer global consistency for correctly consuming the map data. The creation of globally consistent maps as further described herein enables the exploration of different map representations and allows realistic simulation environments to be provided. Systems and methods for creating globally consistent maps as described herein tie all map builds for a given geography together into a statistically cohesive framework by providing historical information from previous map sessions while also inferring trajectories from raw sensor data (cameras, GPS, IMU, encoder, LIDAR) in unmapped areas. Additionally, the framework can also incorporate global accuracy through the addition of survey points. The systems and methods described herein are made more robust by anchoring the map solution relative to known survey points for global accuracy. Key benefits of the systems and methods described herein to downstream users include a wider variety of map representations such as submaps, decompositions of maps into arbitrary spatially indexed containers (e.g., S2 cells, H3 cells, submaps, etc.), more flexible visual rendering of maps, and the ability to use maps in simulations.

In sample embodiments, a georeferenced trajectory estimation system for autonomous vehicles and semi-autonomous vehicles is provided that includes a memory to store instructions and one or more processors using the instructions stored in the memory to perform operations including receiving data generated by a plurality of vehicle sensors of a plurality of vehicles; identifying, from the received data, a first set of sensor measurements for a geographic region taken by a first vehicle over a first period of time, the first set of sensor measurements including (i) first environment geometry data for the geographic region, and (ii) first trajectory data for the first vehicle; identifying, from the received data, a second set of sensor measurements for the geographic region taken by a second vehicle over a second period of time, the second set of sensor measurements including (i) second environment geometry data for the geographic region, and (ii) second trajectory data, not aligned with the first trajectory data, for the second vehicle; aligning the first environment geometry data with the second environment geometry data; and based on the alignment of the first environment geometry data with the second environment geometry data, transforming the first trajectory data and the second trajectory data into a common coordinate frame. The common coordinate frame is used to generate a map that is used to navigate an autonomous or semi-autonomous vehicle. To provide consistent maps, the common coordinate frame persistent in the map is solved for by aligning to the existing map.

In the sample embodiments, the map of the geographic region may be anchored to globally accurate survey control points. The map of the geographic region may be used to navigate an autonomous or semi-autonomous vehicle through the geographic region.

In other sample embodiments, the first trajectory data comprises a first sequence of poses over the first period of time for the first vehicle and the second trajectory data comprises a second sequence of poses over the second period of time for the second vehicle. The first trajectory data and the second trajectory data may comprise measurements of vehicle position, orientation, force, or motion taken from at least one of an inertial measurement unit, a wheel speed encoder, and a GPS unit. These measurements may also be augmented by inter-log point cloud alignments, visual odometry, and the like. On the other hand, the first environment geometry data and the second environment geometry data are taken from one or more LIDAR units, radar units, sonar units, and/or cameras. In the sample embodiments, the sets of sensor measurements include LIDAR beam intensity values for the geographic region, and the first trajectory data and the second trajectory data are transformed into the common coordinate frame based on an alignment of the LIDAR beam intensity values. Environment geometry data from further sets of sensor measurements may be further aligned to transform further trajectory data into the common coordinate frame in a non-rigid manner.

In further sample embodiments, a globally consistent georeferenced trajectory estimation system for autonomous or semi-autonomous vehicles is provided that includes a memory to store instructions and one or more processors using the instructions stored in the memory to perform operations including receiving fixed reference points of a previously generated map; receiving sensor data generated by vehicle sensors of at least one vehicle; identifying, from the received sensor data, a set of sensor measurements for a geographic region taken by the at least one vehicle, the set of sensor measurements including environment geometry data for the geographic region and trajectory data for the at least one vehicle; aligning the environment geometry data with the fixed reference points; generating a map of the geographic region including the environment geometry data and the fixed reference points; and navigating an autonomous or semi-autonomous vehicle using the generated map.

In further sample embodiments, the received data further includes submap data or spatially indexed data (e.g., S2 cells) that is used to provide estimates of where a vehicle in an unmapped area is located by generating a series of pose estimates relating back to a fixed reference point in a previously mapped area. Map-aligned trajectories are generated by one of a number of methods. For example, map-aligned trajectories to constrain trajectories estimated for an unmapped area may be generated by running a localization system of an autonomous or semi-autonomous vehicle against a previously generated map, by using map data from previously generated maps to create reference maps, by running a localization system of an autonomous or semi-autonomous vehicle against a previously generated map and then running a spline estimate generated by optimizing GPS, inertial, encoder data, constraints from aligning LIDAR data from different passes through the same area (same log or different log) and/or poses from aligning LIDAR data to an existing map on the results of running the localization system against the previously generated map, by using multiple map build iterations where spline estimates are used in place of GPS trajectories in at least one map build iteration, and/or by running offline localization with GPS trajectory poses as initial guesses at seams of the unmapped area and an adjacent mapped area.

Definitions

Numerous examples are referenced herein in context of autonomous vehicles. The term "autonomous vehicle" refers to a vehicle that is operated in a state of automation with respect to at least steering and propulsion. Different levels of autonomy may exist with respect to autonomous vehicles. For example, some vehicles may enable automation in limited scenarios, such as on highways, provided that a safety driver is present in the vehicle. More advanced autonomous vehicles can drive without any human assistance from within or external to the vehicle.

The term "spline" is used to refer to a wide class of functions that are used in applications requiring data interpolation and/or smoothing. The data may be either one-dimensional or multi-dimensional. Spline functions for interpolation are normally determined as the minimizers of suitable measures of roughness (for example integral squared curvature) subject to the interpolation constraints. Smoothing splines may be viewed as generalizations of interpolation splines where the functions are determined to minimize a weighted combination of the average squared approximation error over observed data and the roughness measure. For a number of meaningful definitions of the roughness measure, the spline functions are found to be finite dimensional in nature, which is the primary reason for their utility in computations and representation. It will be appreciated that such functions may also incorporate regression and other curve fitting or smoothing methods. Accordingly, such functions may be used interchangeably with the spline functions described herein.

A "geographic region" can refer to any physical area accessible by vehicle and its surrounding environment, including road segments, combinations of road segments, neighborhoods, cities, etc.

One or more aspects described herein provide that methods, techniques and actions performed by a computing device are performed programmatically or as a computer-implemented method. Programmatically means through the use of code or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid-state memory (such as carried on many cell phones and consumer electronic devices), and magnetic memory. Computers, terminals, network-enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog or VHDL. These languages contain instructions that ultimately define the layout of the circuit. However, once the circuit is fabricated, there are no instructions, and the processing is performed by interconnected gates.

Sample Embodiments

FIG. 1 is a block diagram illustrating autonomous vehicles in communication with an autonomous vehicle management system. In the sample embodiment of FIG. 1, an autonomous vehicle (AV) control system 120 can operate an autonomous vehicle through a geographic region for a variety of purposes, including transport services (e.g., on-demand transport, freight and delivery services, etc.). In examples described, autonomous vehicles can operate without human control, and instead, the AV control system 120 can autonomously steer, accelerate, shift, brake, and operate lighting components of the vehicle.

An autonomous vehicle management system 130 can manage a fleet of AVs at different levels of autonomy. For example, some of the AVs can be safety driver autonomous vehicles (SDAV) 101, where a safety driver sits in the driver seat. An SDAV 101 can switch between an autonomous mode, in which the vehicle control system 120 autonomously operates the vehicle, and a manual mode in which the safety driver takes over manual control of the vehicle. Other AVs in the fleet can be fully autonomous vehicles (FAV) 102 with no manual mode or safety driver.

Each AV can be equipped with multiple types of sensors 110 which can combine to provide a computerized perception, or sensor view, of the space and the physical environment surrounding the AV. Likewise, the control system 120 can operate within the AVs to receive sensor data from the AV sensors 110 and control the various vehicle functions in order to autonomously operate the vehicle. For example, the control system 120 can analyze the sensor data to generate low level commands executable by acceleration, steering, and braking systems of the AV. Execution of the commands by the control mechanisms can result in throttle inputs, braking inputs, and steering inputs that collectively cause the AV to operate along sequential road segments according to a route plan.

The AV sensors 110 operate to obtain a live sensor view for the vehicle control system 120 (e.g., in a forward operational direction, or providing a 360-degree sensor view), and to further obtain situational information proximate to the AVs, including any potential hazards or obstacles. The sensors 110 can include both passive sensors and active sensors. The passive sensors can include any number of stereoscopic or monocular cameras, infrared or other proximity sensors, inertial measurement units (e.g., accelerometers, gyroscopes, and/or magnetometers), wheel speed encoders, etc. The active sensors can include sensors 110 that emit electromagnetic radiation to detect return signals (e.g., LIDAR or radar), and in some examples, can also include one or more ultrasonic sensors that emit ultrasonic sounds waves and detect return signals (e.g., return pressure pulses) to enable the control system 120 to perform ranging operations. In addition, the vehicle can further include one or more position sensors, such as a Global Navigation Satellite System (GNSS) unit (e.g., a GPS unit). Note that GPS may be used interchangeably with GNSS throughout this document.

In various examples, some of the AV sensors 110 can be arranged in a sensor suite or sensor array mounted to the exterior of the AV, such as on the front bumper and/or roof. In general, the AV sensors 110 collectively provide sensor data to a localization engine of the vehicle control system 120. The localization engine can also access data storage containing localization maps of the given region in which the AVs operates. The localization maps can comprise a series of road segment submaps or spatially indexed data that enable the localization engine to dynamically determine an estimated state of the AV.

In addition to using the AV sensor data to control the vehicle itself, an AV can timestamp and log the raw sensor data, store the logs in the vehicle's data storage, and upload the logs of the sensor data to the AV management system 130. Using the logs from the fleet of AVs in a geographic region, the AV management system 130 can create and update the localization maps for that region.

According to some examples, an AV can upload its logged sensor data to the AV management system 130 through an AV interface 140, either on a set schedule (e.g., once per hour), in response to a request for the logs, in response to an event, or continuously. The AV interface 140 enables the AV management system 130 to exchange data with the AVs over a network. For example, the AV interface 140 can use one or more network resources (e.g., a cellular transceiver, a WLAN transceiver, etc.) to exchange communications over one or more wireless networks. The AV interface 140 can include or implement an externally-facing application programming interface (API) to communicate data with the AVs. The externally-facing API can provide access to the AV management system 130 via secure channels over the network through any number of methods, including web-based forms, programmatic access via restful APIs, Simple Object Access Protocol (SOAP), remote procedure call (RPC), scripting access, etc. In some examples, the AV management system 130 stores the received AV sensor logs in an AV sensor log database 150.

In some aspects, a georeferenced trajectory estimation system 160 implements a pipeline that takes the raw sensor data in the logs and aligns vehicle trajectories into a common coordinate frame so that the map creation system 170 can generate and update localization maps without fuzzy data or ambiguity. Multiple sets of log data for a single geographic region can be combined to generate more accurate localization maps and fill in gaps that may exist in a single log due to obstructions such as other vehicles (either parked or moving), pedestrians, the space underneath the vehicle, etc. However, even if two sets of log data include sensor measurements for the same region, the sensor measurements are not in alignment with each other.

Generating accurate geometric models for the localization maps relies on the reliability and alignment of the trajectories (i.e., sequence of poses) for each of the logs. Repeated visits to the same region minutes or days apart, whether by the same vehicle or different vehicles, need corresponding pose estimates that accurately co-register sensor data, such as LIDAR point clouds, in the same coordinate frame. Incorrect registration results in multiple ground layers, doubled or fuzzy walls, etc., any of which can challenge or thwart the map creation system 170.

In one implementation, the AV management system 130 can provide a user interface for a user to select a geographic region (e.g., by drawing a polygon on a map, specifying latitude/longitude coordinates, etc.). The georeferenced trajectory estimation system 160 can retrieve the sensor logs that contain sensor data for the selected geographic region and execute the georeferenced trajectory optimization pipeline on the retrieved sensor logs. In addition, the user interface can provide further filtering tools for the logs, such as a filter for type of vehicle that generated the sensor data, a date range for the logs, etc. In other implementations, the AV management system 130, or an external system that interfaces with the AV management system 130, can execute scripts or other automated processes to run the georeferenced trajectory optimization pipeline on programmed regions on a schedule. The AV management system 130 can also generate a report or log to display to users which indicates success or failure of the georeferenced trajectory optimization or map creation process, among other information.

Using the raw sensor data from the sensor logs that correspond to the selected geographic region, the georeferenced trajectory estimation system 160 uses a multi-stage georeferenced trajectory optimization pipeline to align the vehicle trajectories into a common coordinate frame by, for example, fitting the splines to observations and smoothing to a fixed point. In some aspects, the pipeline includes GPS spline estimation, cross-registration target selection, reference map extraction, LIDAR alignment, pose graph optimization, and trajectory optimization, where the GPS spline is estimated based on raw sensor data from GPS, inertial, and encoder data.

In one example, the georeferenced trajectory optimization pipeline results in amendments to each of the AV sensor logs that contain data for the selected region. Specifically, the georeferenced trajectory estimation system 160 overwrites an existing trajectory channel of each log with updated trajectories in the common coordinate frame that are generated from the georeferenced trajectory optimization pipeline. The amended logs can then be stored in the AV sensor log database 150 for subsequent use by the map creation system 170.

The map creation system 170 constructs new localization maps for unmapped geographic regions using the AV sensor logs stored in the AV sensor log database 150, including the logs with updated trajectories generated by the georeferenced trajectory estimation system 160. Once constructed, the AV management system 130 can transmit the localization maps to vehicles in the AV fleet through the AV interface 140, either as push updates or in response to requests from the vehicles for maps.

In various examples, the AV control system 120 can locally store and access the localization maps to perform dynamic comparisons with the live sensor view and to perform object detection and classification operations. As the control system 120 autonomously operates the vehicle along a given route, the AV control system 120 can access sequential localization maps of current road segments to compare the details of a current localization map with the sensor data in order to detect and classify any objects of interest, such as road debris, other vehicles, pedestrians, bicyclists, and the like. In accordance with many examples, the AV control system 120 can provide object of interest data to a prediction engine, where the objects of interest can each be classified (e.g., a pedestrian, a bicyclist, unknown objects, other vehicles, a static object, etc.).

Figure 2:
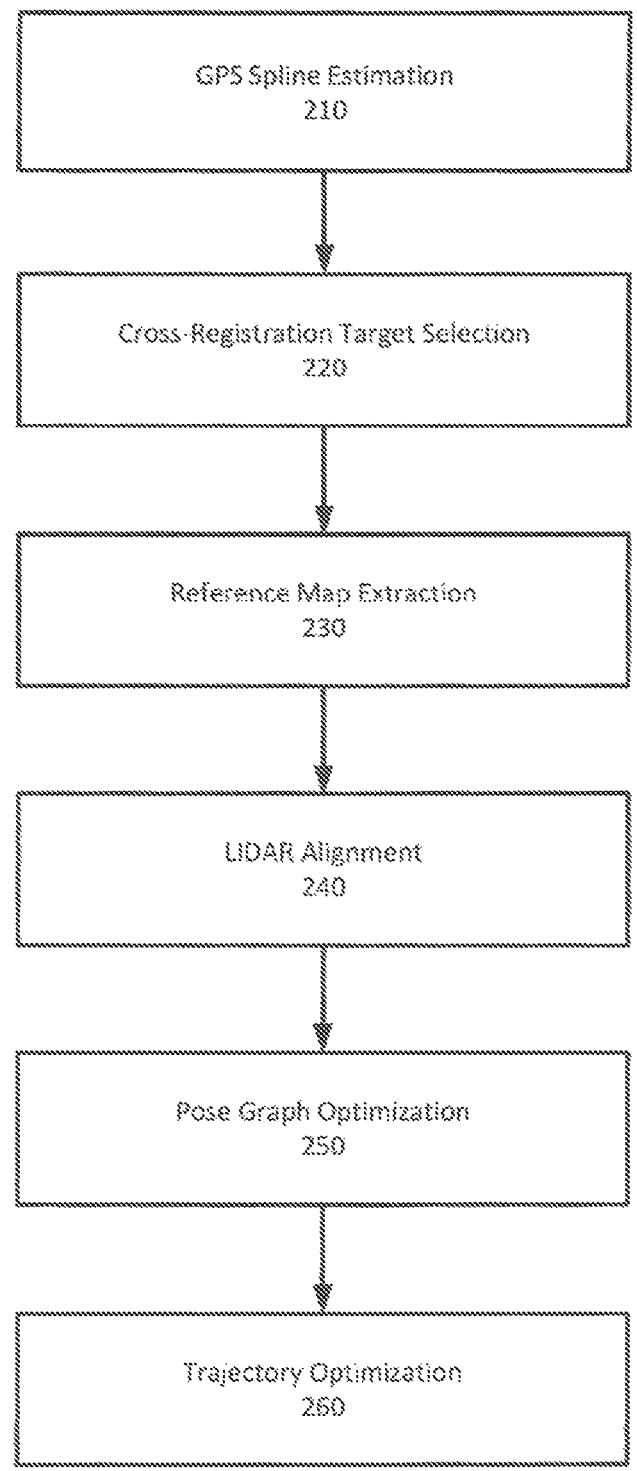
FIG. 2 is a flow chart describing a georeferenced offline trajectory optimization pipeline, according to examples described herein.

FIG. 2 is a flow chart describing a georeferenced offline trajectory optimization pipeline, according to examples described herein. While operations of the pipeline are described below as being performed by specific components, modules or systems of the AV management system 130, it will be appreciated that these operations need not necessarily be performed by the specific components identified and could be performed by a variety of components and modules, potentially distributed over a number of machines. Accordingly, references may be made to elements of the AV management system 130 for the purpose of illustrating suitable components or elements for performing a step or sub-step being described. Alternatively, at least certain ones of the variety of components and modules described in the AV management system 130 can be arranged within a single hardware, software, or firmware component. It will also be appreciated that some of the steps of this method may be performed in parallel or in a different order than illustrated.

According to some aspects, a georeferenced offline trajectory optimization pipeline implements processes that include GPS spline estimation (210), cross-registration target selection (220), reference map extraction (230), LIDAR alignment (240), pose graph optimization (250), and trajectory optimization (260). The georeferenced offline trajectory optimization pipeline uses data from logs generated by vehicle sensors from a fleet of vehicles and identifies sets of sensor measurements for a geographic region taken at different times. The sets of sensor measurements include environment geometry data and trajectory data in local coordinate frames. The georeferenced offline trajectory optimization pipeline aligns the environment geometry data between sets of sensor measurements, and, based on the alignment of the environment geometry data, non-rigidly transforms (e.g., bends/warps) the identified corresponding trajectory data into a common coordinate frame. The georeferenced offline trajectory optimization pipeline can then amend the sensor logs with the updated trajectories, which a map building process can use to generate accurate localization maps for autonomous vehicle operation.

In GPS spline estimation, for each vehicle sensor log, trajectory data from the vehicle's inertial measurement units (IMU), wheel speed encoders, and GPS unit are combined and analyzed to yield a spline trajectory, which is a sequence of positions and orientations of the vehicle that represents the path the vehicle drove through a geographic region (210). The position and orientation of the vehicle at a given time is referred to as the vehicle's pose, and a sequence of poses is referred to as the vehicle's trajectory. In addition, the splines can include velocities (linear and rotational) and accelerations (linear and rotational).

A cross-registration target selection process attempts to find locations where it appears there are multiple splines within threshold physical distances to each other (220). These candidate locations, also known as loop closure opportunities, alignment targets, or registration target events, are where multiple vehicles likely drove or where the same vehicle likely drove more than once. In some aspects, cross-registration target selection also differentiates candidate locations by vehicle heading direction. Passes where vehicles are traveling in the same general direction can be grouped together and considered separately from passes in other directions. For example, if the data show a vehicle traveling north in some cases and south through the same area in a few cases, target selection may select one loop closure opportunity among the north-bound set and another loop closure opportunity among the south-bound set, even if those two locations are positionally close to one another.

A reference map extraction process extracts a small reference map for each of the registration target events (230). In some examples, the process extracts, from the vehicle logs, LIDAR data around the time of the registration target event (e.g., a few seconds before and after the event).

In some aspects, LIDAR alignment attempts to find a transformation between each LIDAR keyframe and its corresponding reference map using LIDAR geometry data (240). This transformation can be represented as a pose and its uncertainty.

The pose graph optimization process reduces errors in the final log trajectories by pulling trajectories together wherever matches are found using the nodes and edges in the pose graph (250). The matches are data for physical locations that the pose graph optimization process determines are the same approximate place at different times. The process determines a spatial relationship between the nodes and gives a correction for each node in the graph.

The trajectory optimization process smooths trajectories in each log by combining logged trajectory measurement data from IMUS and wheel speed encoders with the corrected nose poses (260). Trajectory optimization attempts to generate spline representations that satisfy each of these measurements and minimize error between them. For example, if the pose graph places two adjacent samples at a distance that conflicts with the IMU data, the trajectory optimization process combines the two by attempting to minimize the error in an optimization step. For each log, the trajectory optimization process outputs a new trajectory that is aligned to the other logs in a common reference frame, which can be used to build a map without fuzzy data or ambiguity.

Figure 3A:
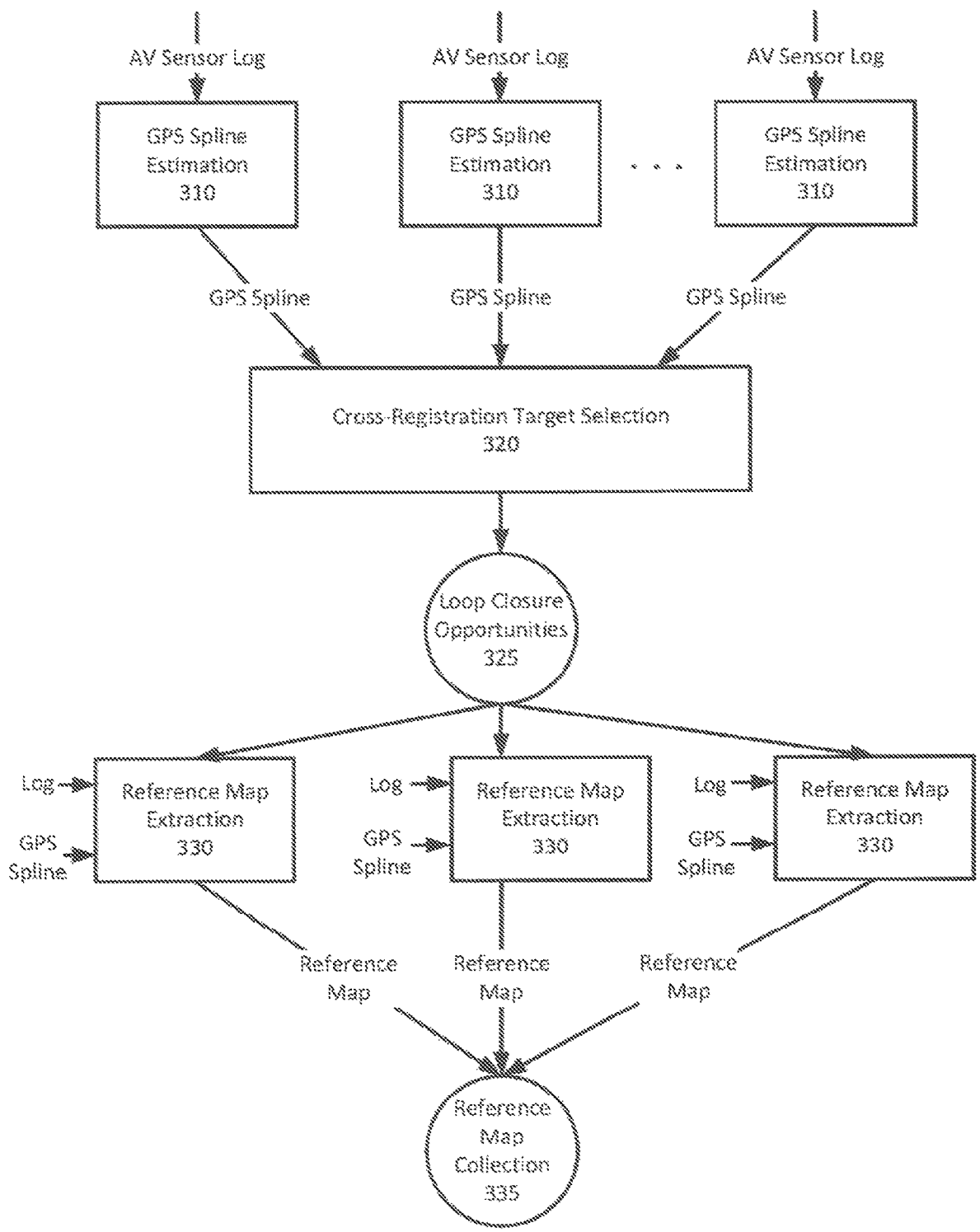
FIG. 3A is a block diagram illustrating example operations and data in a georeferenced offline trajectory optimization pipeline, according to examples described herein.

FIG. 3A is a block diagram illustrating example operations and data in a georeferenced offline trajectory optimization pipeline, according to examples described herein. For each sensor log independently, trajectory data from the vehicle's sensor log are combined in a three-phase trajectory optimization to yield a locally-coherent trajectory with bounded, but potentially large, errors (up to tens of meters). In some examples, the trajectory data includes samples from inertial measurement units (IMU), wheel speed encoders, and a GPS unit. The output of the GPS spline estimation 310 process for each sensor log is a GPS spline. In some examples, the GPS spline is a spline trajectory represented in an appropriate Universal Transverse Mercator (UTM) frame. In other examples, GPS trajectories are given using coordinates in other map projections.

The first phase of GPS spline estimation 310 takes the sensor data and produces a crude but reasonable starting point for subsequent refinement. In some aspects, GPS spline estimation 310 constructs roughly five-minute subsegments of the trajectory, using samples from the IMU and wheel speed encoders, and registers each subsegment to its corresponding GPS samples. This estimated transformation (from the local to common frame) can warp significantly over the duration of the log, and significant numbers of GPS samples may be discarded as outliers in each subsegment fit. By blending together the sequence of transformed subsegments into one contiguous trajectory, GPS spline estimation 310 reliably achieves a starting trajectory within the basin of attraction of one or more programmed thresholds or constraints.

The second phase of GPS spline estimation 310 takes the assembled initial trajectory from the first phase and constructs a spline modeling dynamic GPS bias, odometry scale, and IMU gyro and IMU acceleration bias. The spline and calibration parameters are jointly regressed against sensor measurements and a simple motion model.

The third phase of GPS spline estimation 310 takes the refined trajectory from the second phase as initialization, along with IMU, wheel speed encoder, and bias-corrected GPS samples, and optimizes a richer spline trajectory representation and calibration parameters against the measurements and motion model jointly. For each log, this produces a spline trajectory in a common coordinate frame representing the full six degrees of freedom (6DoF) for pose, velocity, and acceleration of the vehicle as a function of time.

A cross-registration target selection 320 process jointly analyzes the collection of GPS splines to identify distinct regions that are visited multiple times within and across different logs. Such regions are favorable targets for cross-registration of sensor data captured at different times. These targets can be referred to as loop closure opportunities (LCO) 325, even though some targets may not correspond to physical loops in a trajectory. Intersections and other join points are characteristic LCOs, but cross-registration target selection 320 also selects moments from vehicle travel along straight roads traversed multiple times in the logs. Along with the identified targets (specified by a timestamp in one of the sensor logs), cross-registration target selection 320 also enumerates, for each LCO 325, a set of query intervals: {log, [start time, end time]} tuples during which sensor data might be usefully registered to the LCO 325. In some examples, the density of LCOs 325 is limited using a non-maximum suppression scheme that considers the most popular LCOs 325 first, adding more to the chosen set until a target density is reached.

For each LCO 325 independently, a reference map extraction 330 process extracts a small reference map by co-registering LIDAR data from the interval around the LCO time in the source sensor log. In some examples, the interval is a few seconds before and after the LCO time. Longer intervals produce larger reference maps with more error, whereas shorter intervals produce small reference maps that are less likely to find interesting matches. The LIDAR points are then co-registered using the pose estimates from the log's GPS spline estimation. While the GPS spline pose estimates can have substantial absolute error in the global frame, the local motion is accurate. In addition, an Iterative Closest Point (ICP) registration step is performed to refine the estimate so the resulting geometry in each reference map is coherent.

In some aspects, reference map extraction 330 also attempts to identify and remove dynamic objects, such as moving vehicles, pedestrians, etc., from the reference map collection 335. In other aspects, no attempt is made to remove the dynamic objects during reference map generation. As a result, the reference maps can include fuzzy tubes of LIDAR points from moving vehicles and other dynamic scene elements. However, reference maps dominated by such movers are unlikely to yield useful alignments.

Figure 3B:
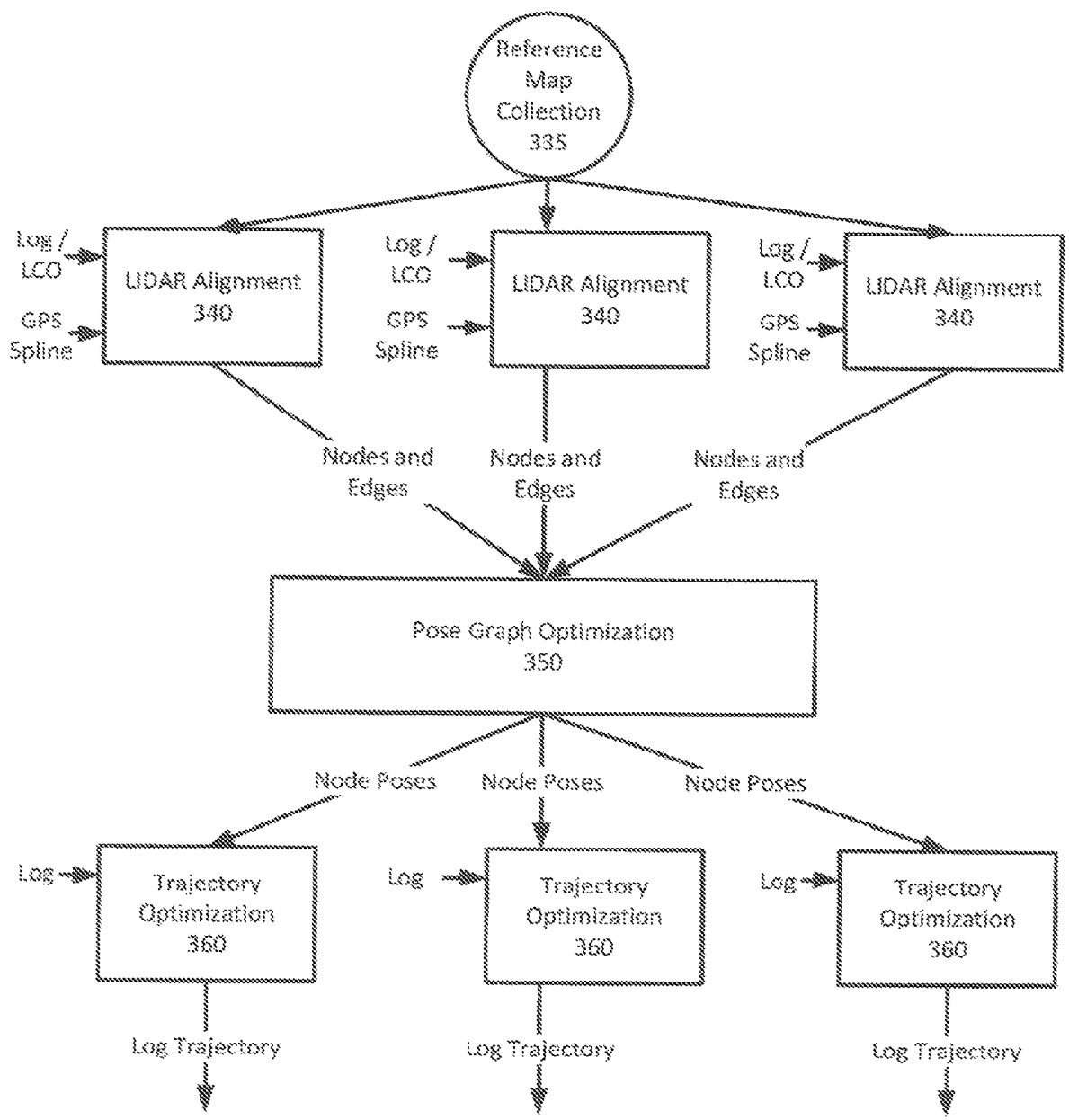
FIG. 3B is a block diagram illustrating further operations and data in a georeferenced offline trajectory optimization pipeline, according to examples described herein.

FIG. 3B is a block diagram illustrating further operations and data in a georeferenced offline trajectory optimization pipeline, according to examples described herein. In some implementations, for each sensor log independently, the GPS spline for that log is traversed to extract environment geometry data. In other implementations, the GPS splines are traversed to extract environment geometry data for each LCO 325 independently.

In some aspects, the environment geometry data are periodic LIDAR keyframes. Each keyframe is a set of co-registered LIDAR points in a local coordinate frame, comprising one or more LIDAR sweeps. In a LIDAR alignment 340 process, these keyframes can be aligned to each other over short time periods and aligned to reference maps produced by the previous step during the corresponding query intervals. Although the process of aligning environment geometry data is described using LIDAR alignment 340, alignment could additionally or alternatively be performed using other data that capture environment geometry/structure/texture, such as sonar, radar, or image data. Thus, as used herein, environmental geometry data is data that describes the position, shape, orientation, and/or other spatial features of objects in the vehicle's environment. Such objects can include roadway surfaces, buildings, geological features, road signs, buildings, other vehicles, and the like. Environmental geometry data can be captured using sensors or sensor systems such as LIDAR, RADAR, SONAR, cameras, etc.

The LIDAR alignment 340 process is achieved by minimizing distances between points and the surface. The result is a maximum-likelihood estimate of the 6DoF rigid transformation (and its uncertainty) between the two coordinate frames.

Unlike steady-state LIDAR alignment on the vehicle, the initial guess for loop closure attempts can be far from accurate. In one aspect, to accommodate this highly uncertain initialization, LIDAR alignment 340 can employ a brute force search over positional perturbations around the relative pose implied by the GPS trajectories to find a good alignment. This perturbed search resembles the process used for LIDAR-based bootstrapping on the vehicle. In another aspect, LIDAR alignment 340 can directly attempt to coarsely register the data, such as by extracting feature descriptors from the LIDAR or camera data and applying a coarse registration technique.

Each successful alignment between neighboring LIDAR keyframes extracted from the log yields an incremental alignment estimate, while each alignment from an extracted LIDAR keyframe to a previously extracted reference map yields a loop closure. Also, incremental estimates can be provided both by alignments and relative poses. Both incremental alignment estimates and loop closures are edges in the resulting pose graph, with the incremental edges being along a same trajectory (e.g., one vehicle driving down a road), and the loop closure edges tying together one trajectory to another (e.g., two vehicles drove down the same road at different times) or two segments of the same trajectory (e.g., one vehicle drove down the same road at different times). In some examples, for faster execution, LIDAR alignment 340 can skip performing incremental alignment between consecutive LIDAR keyframes, instead synthesizing incremental edges using the relative motion encoded in the GPS spline.

In further aspects, LIDAR alignment 340 can incorporate LIDAR beam intensity values into the alignment process. When alignment is based solely on geometry, uniform and plain areas like tunnels and flat fields can be difficult to distinguish. LIDAR beam intensity values that represent the reflectivity of the surface that the LIDAR beam hits can therefore be used to identify bright areas like road lines, tiled walls, colors, etc., enabling LIDAR alignment 340 to more accurately align logs or LCOs.

The collection of incremental alignments and loop closures from the LIDAR alignment 340, in combination with the reference maps, form one large pose graph. The sampled poses and reference maps are the graph's nodes, and the incremental alignment estimates and loop closures form the graph's edges, each an observation of the relative pose between the coordinate frames of its endpoints. The pose graph optimization 350 process determines the layout of the nodes that best satisfies the edges.

Depending on the number of logs and resolution of LIDAR keyframes, this pose graph can be very large. For example, a dataset of 72 logs from northeast San Francisco yields a pose graph with 1.0 M nodes and 2.4 M edges. The graph itself is very sparse, as most nodes are connected only to their predecessors and successors in a chain. The loop closure edges encode the critical constraints that provide an accurate within-log and across-log layout of the resulting graph.

In some aspects, pose graph optimization 350 employs an iterative nonlinear optimization approach. The objective function is iteratively linearized, and the sparse linear system at each iteration is approximately solved using preconditioned conjugate gradients. Next, the node poses are updated in the manifold of rigid transformations according to the solution to the linear system. A schedule of robust cost functions for the edges (first Huber and then Tukey cost functions, with shrinking scales, in some examples) allows the pose graph optimization to converge reliably even when far from the optimum, while fully ignoring outlier edges from spurious or imperfect LIDAR registration.

To improve efficiency of the pose graph optimization 350, the process can employ a coarse-to-fine initialization for improved convergence rates and lower overall runtime. The initial graph is recursively coarsened into progressively smaller graphs by agglomerating neighboring nodes into clusters. Then, starting from the coarsest graph, each level is optimized, and its result is translated up to the next finer level, ultimately yielding an improved initialization for the full resolution graph. The full input graph is then optimized from that starting point. In addition, using the conjugate gradients method for solving sparse systems of linear equations benefits from a good choice of preconditioner. Rather than a simple block-diagonal preconditioner, pose graph optimization 350 can use an incomplete LDLT preconditioner, which yields better conditioning for the long chains and sparse loop closures that characterize these pose graphs.

For each log independently, a trajectory optimization 360 process generates absolute pose estimates from the node pose (i.e., keyframe) layout produced by the pose graph optimization 350. The spline trajectory for the log is then optimized against the IMU, wheel speed encoders, and those synthetic pose estimates. This refinement respects the global layout determined from the pose graph, while still producing a locally smooth and coherent trajectory that satisfies the IMU and wheel speed encoder measurements.

In some aspects, each resulting trajectory is sampled to generate a vehicle pose amendment to its input log. The map creation system can then use these amendments in the localization map creation process.

Figure 4:
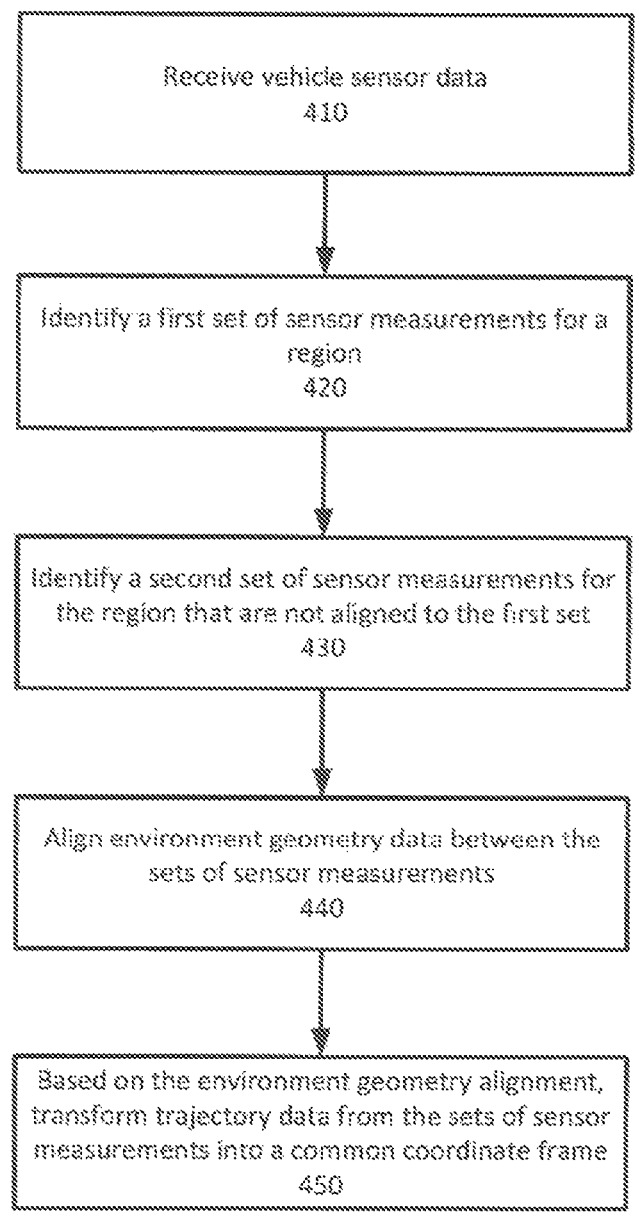
FIG. 4 is a flow chart describing a method of vehicle trajectory mapping, according to examples described herein.

FIG. 4 is a flow chart describing a method of autonomous or semi-autonomous vehicle trajectory mapping, according to examples described herein. Although described with respect to two vehicles, the method of vehicle trajectory mapping can be used to align trajectories in logs from any number of vehicles, including the case where a single vehicle traverses the same geographic region at different times.

With reference to an example of FIG. 4, a georeferenced trajectory estimation system, such as described in FIG. 1, receives data generated by vehicle sensors from a fleet of vehicles (410). According to some aspects, the georeferenced trajectory estimation system identifies, from the received data, a first set of sensor measurements for a geographic region taken by a first vehicle over a first period of time (420). The first set of sensor measurements includes environment geometry data for the geographic region and trajectory data for the first vehicle.

The georeferenced trajectory estimation system identifies, from the received data, a second set of sensor measurements for the geographic region taken by a second vehicle over a second period of time (430). The second set of sensor measurements includes environment geometry data for the geographic region and trajectory data for the second vehicle that is out of alignment with the trajectory data for the first vehicle.

The georeferenced trajectory estimation system aligns the environment geometry data logged from the first vehicle with the environment geometry data logged from the second vehicle (440). Based on the alignment of the environment geometry data, the georeferenced trajectory estimation system transforms the trajectory data logged from both vehicles into a common coordinate frame (450).

The above-described structure of the georeferenced trajectory estimation system generally assumes a local representation is sufficient for all use cases, including for the autonomous vehicle and offboard tasks. In a sample embodiment, the resulting map is represented as a connected graph of submaps, each of which carries its own coordinate frame, and relates to neighboring submaps through a rigid 6 degree-of-freedom (DoF) transformation. Each submap contains multiple layers, each providing a specific type of spatial information covering the submap's core region (typically on the order of 100 m diameter near the submap origin). Submaps are not required to have any absolute accuracy relative to a real-world location (i.e., the submap is placed in the world relative to absolute GPS coordinates), but it is typically assumed that the discrepancy is within 20-25 meters in the worst case. Once localized in a submap, the autonomous vehicle can theoretically maintain a high accuracy map-relative pose estimate considering only local coordinate frames.

While this map representation carries several advantages as an AV-dedicated map, it is sometimes suboptimal for other use cases, such as a simulation. The map representations described above enable local modifications to affect only a very localized neighborhood. For example, to update an area of the map to account for physical changes in the environment, only a small number of submaps are affected. However, error may accumulate when traversing multiple submaps, resulting in unclosed loops when laying out the submaps in the loop in a single coordinate frame. Also, it may be difficult or impossible to use for applications that expect to operate with a global state.

Globally Consistent Maps

The following description provides systems and methods for trajectory estimation from logs to support globally consistent maps that address the issues described above. This process occurs early in the map build process and outputs trajectories that are used downstream for generating prior layers. More specifically, given a set of logs and some survey control points or other fixed reference points, the problem being addressed is to incrementally and iteratively build maps in parts and to update over time using map build data from multiple map build sessions while maintaining consistency across map build sessions. To address these issues, the systems and methods described herein estimate the trajectories of the vehicle for each log that meet the following Trajectory Estimate Criteria:

Trajectory estimates represent the six degree-of-freedom vehicle pose at high frequency over the duration of the log.

The trajectory estimates are smooth and physically valid.

The trajectory estimates are globally consistent. Driving a closed loop results in zero net accumulated trajectory.

The trajectory estimates are self-consistent and cross-log consistent. Passing through the same area multiple times produces precisely aligned sensor readings.

If ground control from survey or other source of absolute accuracy are available, the trajectory estimates attempt to minimize error in absolute accuracy.

Trajectory estimates that traverse mapped and unmapped areas adhere to the properties above, i.e., introducing new sections to the map maintains consistency within the resulting combined trajectory set.

In addition to the criteria specified above, the systems and methods described below support the following objectives:

Producing the map is efficient and scalable.

The method supports updating or replacing small areas of the map (e.g., updated to account for construction, errors in the map, etc.).

The method generally supports concurrent builds of different parts of the map. However, concurrent builds are to be limited to areas that have zero overlap of new areas intending to be mapped.

The method is able to support map builds covering large distances, including across multiple Universal Transverse Mercator (UTM) boundaries.

The method supports updates to small, targeted sections of the map without needing to update the entire map.

Ideally, the accumulated error during the map build approximates zero.

It will be appreciated by those skilled in the art that global consistency does not imply absolute accuracy and vice versa. Fortunately, they are not mutually exclusive, and it is possible to achieve both (not necessarily for free). Some benefits of maximizing absolute accuracy include improved localization performance, assuming the initial guess is based on GPS. GPS samples are more likely to correspond to map coordinates (except in areas of systematic bias due to multipath effects, such as dense downtown cores). Also, both GPS and map-relative pose estimates may be included in the same state estimator (i.e., the same extended Kalman filter (EKF) can handle both types of measurements). In addition, global consistency permits consistency (or bounded consistency) with existing map systems and enables more straightforward integration with and visualization in third-party tools.

The system and method described below for providing globally consistent maps builds on the georeferenced trajectory estimation system described above. As noted above, the georeferenced trajectory estimation system takes in a set of logs as input and produces a trajectory for each log based on the raw sensor data (camera imagery, IMU, GPS, encoder, LIDAR) that may or may not be tied to an absolute reference frame. The resulting trajectories are consistent in that they meet the first three Trajectory Estimate Criteria noted above. While the results from a single map build session are consistent, there is currently no mechanism to maintain consistency across multiple map build sessions. The system and method described below introduces consistency across multiple map build sessions by varying the trajectory estimation approach depending on whether the area is already mapped. For areas that have already been mapped, trajectories are based on alignment to the map (either using priors as reference maps or running the localization system against the map). For areas not already mapped, georeferenced trajectory estimation based on raw sensor data as described above may be utilized. To combine the trajectory segments, the georeferenced trajectory segments are smoothly blended into the map-aligned trajectory segments without modifying the localized trajectory segments.

This process maintains an invariant that the map is globally consistent. Initially, the unpopulated map is trivially globally consistent. Subsequent map building sessions add sections to the map that do not break consistency since they do not modify the existing map, and new sections are blended in in a way that preserves the global consistency invariant.

To ensure that the map building sessions are consistency-preserving, some process constraints are applied:

Concurrent mapping builds should not overlap. This constraint can be handled by planned map build features including a locking mechanism to prevent any intersection between intended build targets that are not already in the map and using a queue to verify that landing the changes in the map is permitted upon completion.

The map build sessions will be constrained to covering areas within the existing map if one is available. Coverage outside the existing map could result in a sequence of map build sessions completing a loop closure where the accumulated error introduces distortion or inconsistency in the trajectories.

The map build strategy follows a well-defined process. Guidelines on how to design a suitable initial map and how to choose subsequent builds are specified prior to map builds.

The map build architecture for providing globally consistent maps now will be described with respect to FIG. 5.

Figure 5:
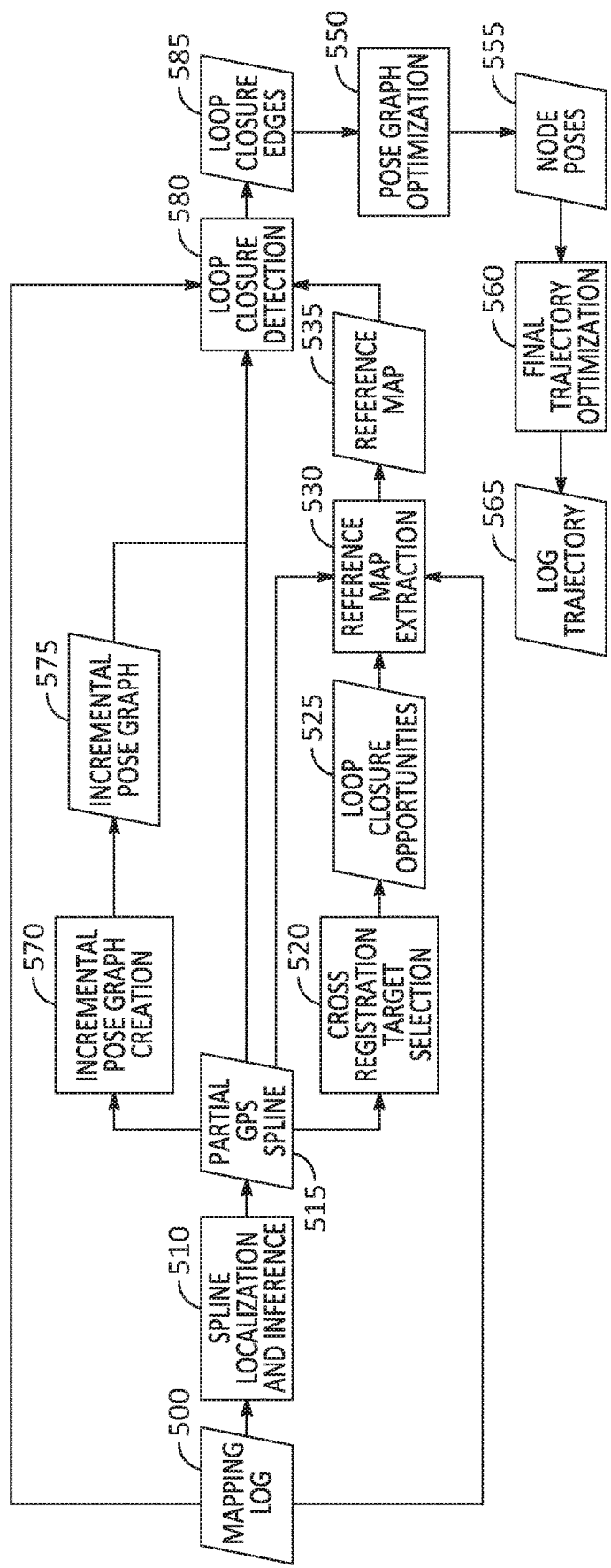
FIG. 5 illustrates the map build architecture for providing globally consistent maps in a sample embodiment.

As illustrated in FIG. 5, the map build architecture receives mapping log inputs 500 such as AV sensor log data (FIG. 3B) Each log used as an input has valid GPS, IMU, LIDAR, and encoder data. Some logs may have naturally occurring stationary periods due to traffic lights, stop signs, etc. that can be used for bias estimation. The set of input logs 500 also should have overlap in unmapped areas (a single log with multiple passes in an area is okay), and if a map is available it should overlap with the existing mapped area. Accurate absolute constraints may be provided but are not required. If absolute constraints will be used to map a city, then some should be present in the initial map build run for that city.

In sample embodiments, the mapping log inputs 500 further include submap data or spatially indexed data that can be used to provide estimates of where the vehicle is located by mapping from unmapped areas back to mapped areas to fill in the unmapped areas. Thus, the system illustrated in FIG. 5 can relate to stored maps when collecting build data and can populate the map being built relative to the known map data. In examples described herein, the known map data may be used in the mapping process for mapping unmapped areas. Accordingly, steps are taken to avoid distortions in the created map as newly mapped sections are added to the existing map. The trajectory data from multiple map build data collection sessions is aligned to build up the map data over several map build sessions. An offline batch process may align the data with the existing maps of the mapped areas.

As illustrated in FIG. 5, splines are generated at 510 in parallel for each mapping log 500. The initial spline generation at 510 creates partial GPS splines 515 that are both constructed from GPS, IMU, and encoder data in areas where localization to a map is not available and uses available localization information when maps are available. The key differences in the initial spline estimation between steps 310 (FIG. 3A) and 510 are the ability to localize to an existing map where available, the generation of several partial GPS splines 515 per log instead of a single GPS spline per log, and trajectories generated by localizing to the map have additional information for estimating internal state such as IMU biases, etc. It is noted that in another embodiment a single GPS spline may be used that respects the fixed poses where the vehicle was aligned to the map.

The partial GPS splines 515 are applied to the cross-registration target selection 520 process to jointly analyze the collection of partial GPS splines 515 in parallel to identify the distinct regions that have been visited multiple times within and across the different mapping logs 500 to identify loop closure opportunities 525. As in the embodiment of FIG. 3A, the loop closure opportunities 525 are processed by reference map extraction 530 to identify and remove dynamic objects to product a reference map 535. The reference map is generated once per loop closure opportunity to be used for registering trajectories in the same geographic region. The partial GPS splines 515 are also provided to incremental pose graph generation process 570 in parallel, once for each spline, and each spline is sampled at regular time intervals to compute transformations between samples to create an incremental pose graph 575. Nodes in the incremental pose graph 575 are aligned to the reference maps 535 when the reference maps 535 are available. The partial GPS splines 515, reference map 535, and incremental pose graph 575 are provided to loop closure opportunity detection process 580, which runs once for a set of generated splines to examine all splines to find geographic overlaps that could result in loop closures. The resulting loop closure edges 585 are provided to pose graph optimization process 550 to determine the layout of the nodes that best satisfies the loop closure edges 585. The resultant node poses 555 are provided to the final trajectory optimization process 560 to generate absolute pose estimates from the node pose 555 layout produced by the pose graph optimization process 550. The pose graph optimization process 505 is performed once in parallel for each statistically independent pose graph 575.

Statistically independent pose graphs 575 are made possible in this embodiment because of the way that spline trajectories are generated. Therefore, pose graph optimization can be run in parallel for statistically independent pose graphs where there are no connections between different parts of the pose graph. The spline trajectory for the log is optimized and in the final trajectory optimization process 560 in parallel, once per log at most. All independent spline information for all the splines from one log are accumulated, and the results are smoothed to ensure feasible dynamics. The resulting log trajectory 565 is output for use in the map build. In this embodiment, the final trajectory optimization process is modified to used fixed control points to transition splines to where they are supposed to be.

Figure 6:
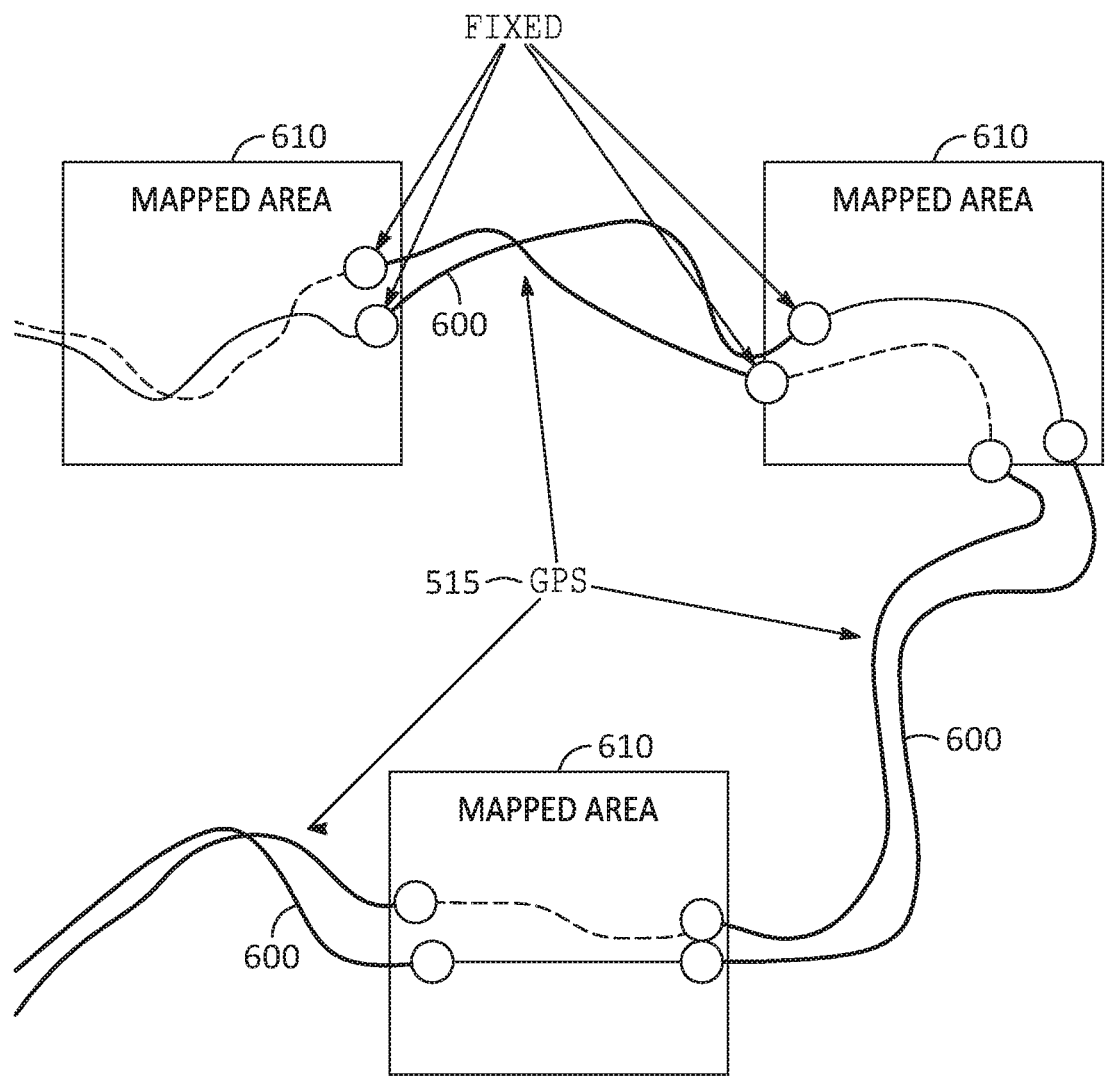
FIG. 6 illustrates partial GPS splines and fixed splines for transitioning the splines to fixed control points for connecting the respective mapped areas in accordance with the process of FIG. 5.

FIG. 6 illustrates partial GPS splines 515 and fixed splines 600 for transitioning the splines to fixed control points for connecting the respective mapped areas 610 in accordance with the process of FIG. 5. In FIG. 6, each group of illustrated splines represents a statistically independent pose graph. As illustrated, the goal is to provide a smooth transition when connecting mapped areas 610 together.

Figure 7:
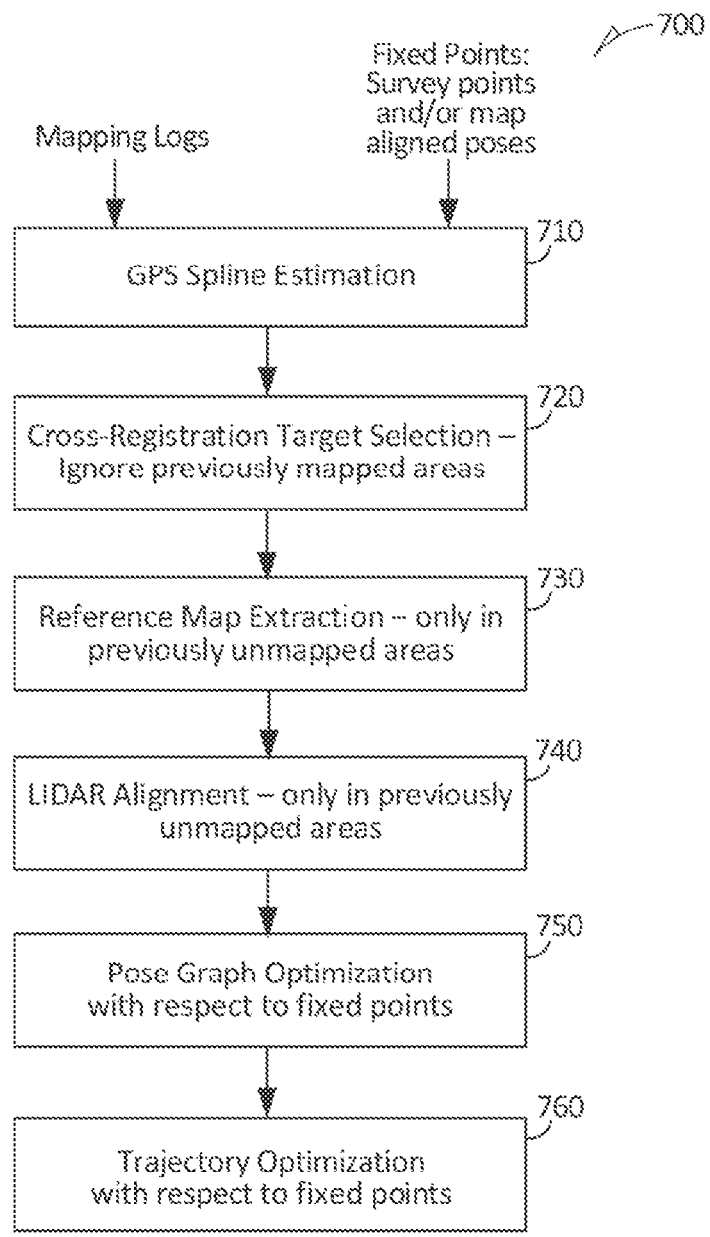
FIG. 7 is a flow chart modifying the georeferenced offline trajectory optimization pipeline of FIG. 2 to include log trajectory estimation for globally consistent maps according to examples described herein.

FIG. 7 is a flow chart modifying the georeferenced offline trajectory optimization pipeline of FIG. 2 to include log trajectory estimation for globally consistent maps according to examples described herein with respect to FIG. 5. As with respect to FIG. 2, while operations of the pipeline are described as being performed by specific components, modules or systems of the AV management system 130, it will be appreciated that these operations need not necessarily be performed by the specific components identified and could be performed by a variety of components and modules, potentially distributed over a number of machines. Accordingly, references may be made to elements of the AV management system 130 for the purpose of illustrating suitable components or elements for performing a step or sub-step being described but are not limited thereto.

The georeferenced offline trajectory optimization pipeline 700 including log trajectory estimation for globally consistent maps in sample embodiments include GPS spline estimation (710), cross-registration target selection (720), reference map extraction (730), LIDAR alignment (740), pose graph optimization (750), and trajectory optimization (760). However, the pipeline 700 receives not only the mapping logs from the mapping vehicles but also data representing fixed points in the form of survey points (that may or may not be absolutely accurate survey points) on a known map and map aligned poses that are related back to existing map areas. As described above, the data representing fixed points on a known map provides reference points for the unmapped area. For example, the fixed points may be survey points including aerial survey points, manhole covers, and the like in known mapped areas adjacent the unmapped area. The georeferenced offline trajectory optimization pipeline 700 uses the data representing fixed points as well as data from logs previously generated by vehicle sensors from a fleet of mapping vehicles and identifies sets of sensor measurements for a geographic region taken at different times and references the data to known fixed points in known mapped areas. The sets of sensor measurements include environment geometry data and trajectory data in local coordinate frames. The georeferenced offline trajectory optimization pipeline 700 aligns the environment geometry data between sets of sensor measurements, and, based on the alignment of the environment geometry data, non-rigidly transforms (e.g., bends/warps) the identified corresponding trajectory data into a common coordinate frame including the fixed reference points. The georeferenced offline trajectory optimization pipeline 700 can then amend the sensor logs with the updated trajectories, which a map building process can use to generate accurate localization maps for autonomous or semi-autonomous vehicle operation.

In GPS spline estimation 710, for each vehicle sensor log, trajectory data from the vehicle's inertial measurement units (IMU), wheel speed encoders, and GPS unit are combined and analyzed to yield a spline trajectory. As with respect to the embodiment of FIG. 2, the splines can include velocities (linear and rotational) and accelerations (linear and rotational). However, as described with respect to FIG. 5 and illustrated with respect to FIG. 6, the splines are adapted to connect the vehicle trajectory data to certain of the fixed reference points.

As in the embodiment of FIG. 2, the cross-registration target selection process 720 attempts to find locations where it appears there are multiple splines within threshold physical distances to each other. These candidate locations, also known as loop closure opportunities, alignment targets, or registration target events, are where multiple vehicles likely drove or where the same vehicle likely drove more than once. The cross-registration target selection process 720 operates like the corresponding process in FIG. 2 except that the previously mapped areas are ignored.

The reference map extraction process 730 extracts a small reference map for each of the registration target events including, for example, extracting from the vehicle logs LIDAR data around the time of the registration target event (e.g., a few seconds before and after the event). The reference map extraction process 730 operates like the corresponding process in FIG. 2 except that the previously mapped areas are ignored.

As in the embodiment of FIG. 2, the LIDAR alignment 740 attempts to find a transformation between each LIDAR keyframe and its corresponding reference map using LIDAR geometry data. This transformation can be represented as a pose and its uncertainty. However, unlike the embodiment of FIG. 2, the LIDAR alignment 740 aligns LIDAR data in the vehicle logs to reference maps that may include fixed reference points that tie the LIDAR data in the vehicle logs to existing mapped areas that may, in turn, be tied to global coordinate systems. The LIDAR alignment 740 may or may not distinguish a local reference map from any fixed data points, and the offline alignment process is the same. The LIDAR alignment 740 otherwise operates like the corresponding process in FIG. 2 except that the previously mapped areas are ignored.

The pose graph optimization process 750 reduces errors in the final log trajectories by pulling trajectories together wherever matches are found using the nodes and edges in the pose graph. The matches are data for physical locations that the pose graph optimization process determines are the same approximate place at different times and aligns these locations to the fixed reference points of the fixed survey points. The process determines a spatial relationship between the nodes and gives a correction for each node in the graph, where in this embodiment the graph further aligns and optimizes the log data with respect to the fixed reference points.

The trajectory optimization process 760 smooths trajectories in each log by combining logged trajectory measurement data from IMUs and wheel speed encoders with the corrected poses aligned with the fixed reference points. Trajectory optimization attempts to generate spline representations that satisfy each of these measurements and minimize error between them. For example, if the pose graph places two adjacent samples at a distance that conflicts with the IMU data, the trajectory optimization process combines the two by attempting to minimize the error in an optimization step. For each log, the trajectory optimization process 760 outputs a new trajectory that is aligned to the other logs in a common reference frame that is aligned with the fixed reference points, which can be used to build a globally consistent map without fuzzy data or ambiguity.

Figure 8:
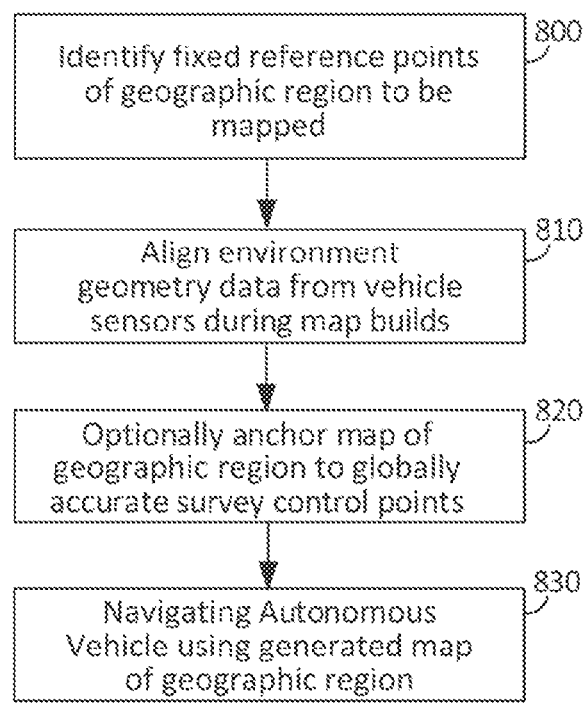
FIG. 8 is a flow chart describing a method of vehicle trajectory mapping for providing globally consistent maps according to examples described herein.

FIG. 8 is a flow chart describing a method of autonomous or semi-autonomous vehicle trajectory mapping for providing globally consistent maps according to examples described herein. Generally, the vehicle trajectory mapping for providing globally consistent maps is similar to that disclosed in FIG. 4 except that the common coordinate frame is aligned with fixed reference points of previously generated maps. To perform such alignment, fixed reference points of the geographic region to be mapped are identified at 800. Environment geometry data generated from vehicle sensors during subsequent map builds is aligned to the fixed reference points to generate a map of the geographic region at 810. The alignment process may include using map data to provide estimates of where a vehicle in an unmapped area is located by generating a series of pose estimates relating back to fixed reference points in a previously mapped area. As explained further below, the map-aligned trajectories to constrain trajectories estimated for an unmapped area may be generated in a number of ways including by running a localization system of an autonomous or semi-autonomous vehicle against a previously generated map, by using map data from previously generated maps to create reference maps as the common coordinate frame, by running a localization system of an autonomous or semi-autonomous vehicle against a previously generated map and then running GPS spline optimization on the results of running the localization system against the previously generated map, by using multiple map build iterations where spline estimates are used in place of GPS trajectories in at least one map build iteration, and/or by running offline localization with GPS trajectory poses as initial guesses at edges of the unmapped area and an adjacent mapped area. Optionally, the map of the geographic region is anchored to globally accurate survey control points at 820. The generated map of the geographic region is then provided to a vehicle at 830 to enable the vehicle to navigate through the geographic region.

In sample embodiments, absolute accuracy can be incorporated into the map by using survey control points as the fixed reference points to anchor samples in the trajectory during the trajectory optimization steps described above. As used herein, a survey control point is a 2D or 3D point that has a known absolute location within some error bound of its ground truth location. Survey control points do not guarantee that the map will have perfect absolute accuracy. However, survey control points can help reduce the error between the estimate and the absolute ground truth, assuming they are reliable estimates themselves. Note that they only help reduce error if they originate from a common and consistent source to ensure that they are in a consistent frame.

In sample embodiments, there are several options for obtaining the survey control points referenceable to data collected on the vehicle. Appropriate survey control points include manual identification and association between ground truth imagery and the map build results. Professional surveyors using an RTK-localized terrestrial laser scanner (TLS; e.g., FARO or Leica brand) may produce a detailed point cloud of intersections or other interesting areas. This should be straightforward to integrate into the map build process as fixed reference maps. Survey control points may also include matching ground level 3D point clouds or imagery as measured on the vehicle to georectified aerial mapping data taken from aerial imagery, assuming a source of ground truth aerial imagery set exists. On the other hand, the survey control point could be something as simple as a manhole cover or something that can be translated to a manhole cover as detected by sensors of the vehicle.

Inappropriate survey control points may include existing survey markers such as steel disks commonly used in surveying. These are not referenceable unless easily detectable in a vehicle's sensor suite. Also, anything that is likely to be removed or changed between when the survey data is acquired and when the log data is acquired is undesirable for use as a survey control point. In general, if survey control points move (e.g., refreshed aerial imagery), the map would need to be restarted from scratch, though it may be possible that some map production artefacts can be adjusted to the new map. In the event that the transformation between the old and new survey points can be approximated by a rigid transform, it may be possible to shift the coordinate frame rather than rebuilding (likely only reasonable for per-city maps).

The systems and methods described herein enable end-to-end execution of the process for generating globally consistent trajectories for logs and produce globally consistent maps. Such techniques allow further development and integration with other map building concepts and tools, including the use of alternative container models such as S2 cells, map build pipeline/workflow changes, use of a locking mechanism in the map build workflow to prevent consistency conflicts, and validation/testing/visualization/quality checks. The techniques described herein also enable a single concurrent build, or manual determination of permitted concurrent builds.

It is generally desired that the maps for use by vehicles have locking and version control capabilities to ensure that map builds happen safely. Locking mechanisms ensure that concurrent map builds do not cover overlapping areas. In sample embodiments, the locking mechanism may include barring overlapping areas of the map from being built simultaneously and possibly adding a minimum distance between areas before they can be simultaneously built. On the other hand, version control enables erroneous changes to the map to be easily undone. In sample embodiments, the map version may be updated every time the map geometry is modified. The map may be updated and "merged" into the map sent to the vehicle for use if the newly created map passes a series of tests. Also, before adding a new map build to the map, the system may confirm that the part of the map near the build is unchanged from the version of the map that the map build was run on.

In further embodiments, a set of fixed pose constraints are generated by aligning the sensor data to the map in the mapped areas so that the optimization steps do not move any of the points since the existing map remains fixed. As used herein, a "fixed pose constraint" is a vehicle pose that should not be moved in an optimization that estimates the vehicle trajectory (or multiple vehicle trajectories). In such an embodiment, the localization system is run on the intervals of the trajectories that intersect the existing map to produce a set of fixed pose constraints. However, for each interval, there may be a "lag" before the localization system converges to a steady-state, and therefore a small portion at the start of the trajectory interval does not have alignments to the map. To align this small portion, the system steps backwards in the trajectory (i.e., backwards in time) from a first alignment (where the localization system is initialized) until the trajectory is deemed to no longer be intersecting with the map. At each time step, the sensor (LIDAR) data is aligned to the map using the previous estimate to guide the initial guess for the alignment.

Figure 9:
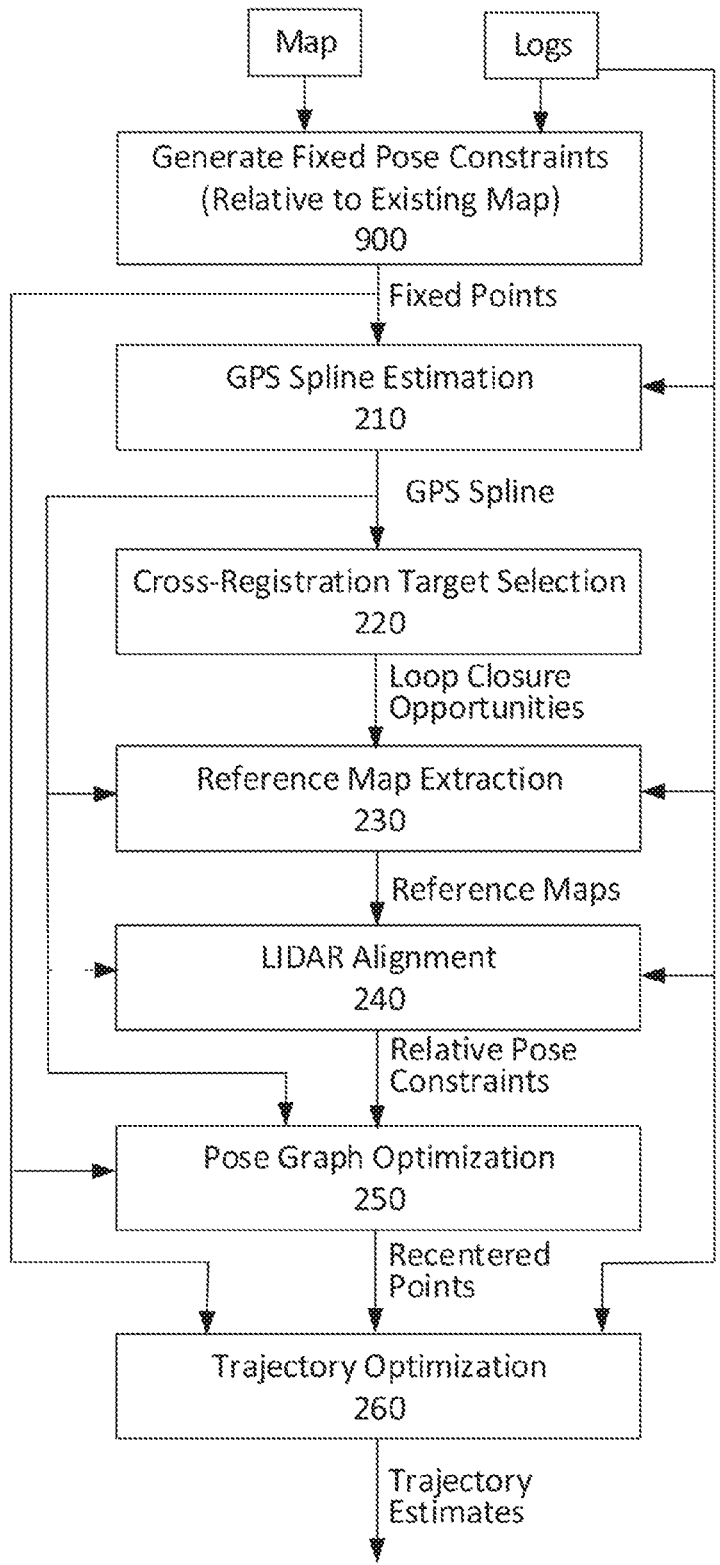
FIG. 9 is a flow chart modifying the georeferenced offline trajectory optimization pipeline of FIG. 2 to include fixed pose constraints, according to examples described herein.

FIG. 9 illustrates the embodiment of FIG. 2 modified to incorporation fixed post constraints. As illustrated, fixed pose constraints relative to an existing map are generated from the map data and log data at step 900. The resulting fixed points are provided to the GPS spline estimating step 210 of FIG. 2 to optimize the GPS splines using not only the sensor data from the GPS, IMU, and encoders but also the fixed pose constraints. Similarly, pose graph optimization in step 250 is modified to optimize the pose graph using not only relative pose constraints (from incremental steps along the GPS spline and from aligning radar data at loop closures) but also uses the fixed pose constraints. Also, the trajectory optimization in step 260 is modified to include not only the sensor data from the IMU and encoders and relative pose constraints (from the optimized pose graph), but also the fixed pose constraints. In addition, for "absolute accuracy," constraints may be added to the pose graph optimization and final trajectory optimizations that would provide relative transforms from some poses in the trajectory to a set of anchor points (e.g., from survey or other sources such as alignment to orthorectified aerial imagery). The inclusion of such constraints is optional and could be used for minimizing error with respect to an absolute reference frame. Thus, the optimization steps are modified to account for the fixed pose constraints based on alignments of the sensor data to the map.

In other embodiments, map-aligned trajectories may be generated by running the localization system in the mapped areas, running sequential alignment algorithms from the start of each map-aligned trajectory segment backwards until the propagated pose has left the map (to account for lag in localization when transitioning from the unmapped area into the mapped area), and running a GPS spline optimization, which uses the alignments from the previous alignments as fixed (unmovable) points in the mapped areas and GPS plus inertial data plus encoder data in the unmapped areas. In such as case, the pose graph optimizations described herein could occur in parallel over disconnected or disjoint trajectory components.

Map aligned trajectories may also be generated using map prior data to create the reference maps. In such a case, a more uniform algorithm with more straightforward handling at the map boundaries is provided that does not actually require spline blending. Constraints are fixed in pose graph optimization instead. This approach also does not require integration or dependency on the localization system. This approach also allows parallel pose graph optimization across connected components. However, in this approach, the initial guess from the GPS trajectory and map prior reference map may be far off and, accordingly, alignments may be less likely to succeed.

In another approach, map aligned trajectories may be generated by combining the localization system and map prior (initial guess) approaches. In this case, localization would be run on the log against the map and the GPS spline optimization would then be run. The GPS spline may have some bias relative to the map. However, correspondences between the two trajectories can be trivially obtained in the mapped area based on corresponding timestamps. Minimizing the error between the two (even rigid translation might suffice) corrects the GPS spline such that the location of entry into the mapped area is more accurate. This will make it easier to register log data against the reference map generated from the map prior (better initial guess). Such a combined approach has a higher likelihood of successful alignments near the boundaries between mapped and unmapped areas as compared to the map prior option. Also, this approach does not actually require spline blending; constraints are forced in pose graph optimization instead. This approach also permits parallel pose graph optimization across connected components.

As yet another approach to generating map-aligned trajectories, multiple map build iterations may be used. For example, a combined option may be run up to the rigid alignment, and then carry on like a standard map build session (with the corrected splines in place of the standard GPS splines). The process would then run the full combined option with the resulting spline estimates in place of the GPS splines. This approach may potentially increase the likelihood of success since more accurate trajectory splines are provided as input. However, this approach may take approximately twice the execution time.

As still another approach to generating map-aligned trajectories, the first steps of the combined approach up to the rigid alignment may be implemented before re-running offline localization with the updated GPS spline poses as initial guesses at the map/off-map seams. This approach significantly reduces the lag at the seams; however, there is still no guarantee that the initial guesses occur right at the seams and explicit spline blending may be required.

It will be appreciated that different roads and infrastructure between different cities do not lend themselves to a single data collection strategy that will work for all.

An algorithm may be used determine if fixed reference points meet density requirements. Such an algorithm may check for a region growing from seed locations (Voronoi-like cells) and/or a recursive max-cut on an interior road graph. The algorithm may factor in higher costs for non-arterial roads and road switching.

It will be appreciated by those skilled in the art that global consistency enables additional use cases currently not easily handled by a globally inconsistent map. Such use cases include simulation, which uses engines that require a global map frame. Also, users that wish to render a global view of the map need a globally consistent map or else risk visually suboptimal results. Also, global consistency provides more flexibility for the underlying map representation. A globally consistent map can be broken up into submaps, cells, tiles, or streamed to consumers in a more continuous fashion. An abstraction layer should hide this internal representation from the end-user. Finally, in the case of a map represented as a submap graph, globally consistent trajectories eliminate the need for separate estimation of submap-to-submap alignment, which is a potential source of error in the mapping process. Global consistency can further simplify a submap graph representation in that the relative transform applied when transitioning from one submap frame to another is known exactly and therefore no additional uncertainty is introduced.

On the other hand, the requirement to maintain global consistency can make the map more brittle. If an action occurs that violates the global consistency invariant, and it is not caught, it is likely costlier to backtrack to the consistent state prior to the error being introduced. In other words, undo is more difficult when errors get introduced.

As another alternative, a single persistent map build session may be used for an entire city. Reference maps and pose graph edges are accumulated as new logs are added. In this approach, all map builds are consistent and significant warping of trajectories is not an issue. However, optimization of the accumulated pose graph becomes too large a problem to manage and map updates require optimization of an entire city rather than a small local area.

Computer System

Figure 10:
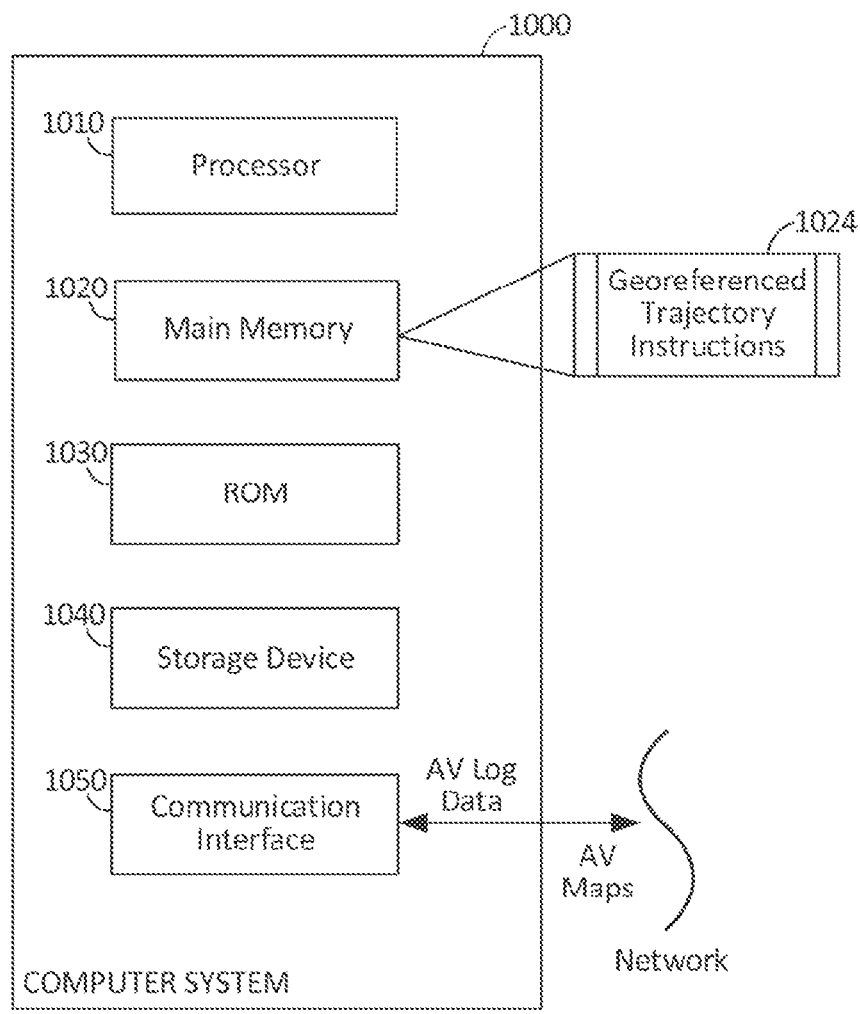
FIG. 10 is a block diagram illustrating a computer system upon which examples described herein may be implemented.

FIG. 10 is a block diagram that illustrates a computer system upon which examples described herein may be implemented. A computer system 1000 can be implemented on, for example, a server or combination of servers. For example, the computer system 1000 may be implemented as part of a network computer system for routing and operating autonomous and semi-autonomous vehicles. In the context of FIG. 1, the AV management system 130 can be implemented using a computer system 1000 such as described by FIG. 10. The AV management system 130 may also be implemented using a combination of multiple computer systems such as described by FIG. 10.

In one implementation, the computer system 1000 includes processing resources, a main memory 1020, a read-only memory (ROM) 1030, a storage device 1040, and a communication interface 1050. The computer system 1000 includes at least one processor 1010 for processing information stored in the main memory 1020, such as provided by a random-access memory (RAM) or other dynamic storage device, for storing information and instructions which are executable by the processor 1010. The main memory 1020 also may be used for storing temporary variables or other intermediate information during execution of instructions to be executed by the processor 1010. The computer system 1000 may also include the ROM 1030 or other static storage device for storing static information and instructions for the processor 1010. A storage device 1040, such as a magnetic disk or optical disk, is provided for storing information and instructions.

The communication interface 1050 enables the computer system 1000 to communicate with one or more networks (e.g., a cellular network) through use of a network link (wireless or wired). Using the network link, the computer system 1000 can communicate with one or more computing devices, one or more servers, and/or one or more vehicles. In accordance with some examples, the computer system 1000 receives AV sensor log data from a fleet of autonomous vehicles and transmits AV localization maps to the autonomous vehicles. The executable instructions stored in the memory 1030 can include georeferenced trajectory instructions 1024 to perform one or more of the methods described herein when executed.

By way of example, the instructions and data stored in the memory 1020 can be executed by the processor 1010 to implement the example AV management system 130 of FIG. 1. In performing the operations, the processor 1010 can handle receiving and storing AV sensor log data, calculating georeferenced trajectories, creating localization maps, and transmitting the localization maps to a fleet of AVs. The processor 1010 executes instructions for the software and/or other logic to perform one or more processes, steps, and other functions described with implementations such as described by FIG. 1 through FIG. 9.

Examples described herein are related to the use of the computer system 1000 for implementing the techniques described. According to one example, those techniques are performed by the computer system 1000 in response to the processor 1010 executing one or more sequences of one or more instructions contained in the main memory 1020. Such instructions may be read into the main memory 1020 from another machine-readable medium, such as the storage device 1040. Execution of the sequences of instructions contained in the main memory 1020 causes the processor 1010 to perform the process steps described herein. In alternative implementations, hard-wired circuitry may be used in place of, or in combination with, software instructions to implement examples described herein. Thus, the examples described are not limited to any specific combination of hardware circuitry and software.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

It is contemplated for examples described herein to extend to individual elements and concepts described, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

Executable Instructions and Machine-Storage Medium

The various memories (i.e., 1020, 1030, and/or memory of the processor unit(s) 1010) and/or storage device 1040 may store one or more sets of instructions and data structures (e.g., instructions) 1024 embodying or utilized by any one or more of the methodologies or functions described herein. These instructions, when executed by processor unit(s) 1010 cause various operations to implement the disclosed examples.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1040 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 can further be transmitted or received over a communications network using a transmission medium via the network interface device 1050 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A globally consistent georeferenced trajectory estimation system for vehicles, comprising:
   a memory to store instructions; and
   one or more processors using the instructions stored in the memory to perform operations including:
   obtaining fixed reference points of a previously generated map;
   obtaining sensor data generated by vehicle sensors of at least one vehicle;
   identifying, from the sensor data, a set of sensor measurements for a geographic region taken by the at least one vehicle, the set of sensor measurements including environment geometry data for the geographic region and trajectory data for the at least one vehicle;
   generating an estimated trajectory for a first vehicle of the at least one vehicle, the estimated trajectory comprising a sequence of pose estimates referenced from at least one of the fixed reference points, at least a portion of the estimated trajectory being in an unmapped area outside the previously generated map;
   aligning the environment geometry data with the fixed reference points using the estimated trajectory;
   generating a map of the geographic region including the environment geometry data and the fixed reference points; and
   providing the map to an autonomous vehicle (AV) to control the AV according to the map.

2. The georeferenced trajectory estimation system of claim 1, wherein obtaining data generated by vehicle sensors of the at least one vehicle includes obtaining and aligning environmental geometry data and trajectory data captured during multiple passes of the geographic region by the at least one vehicle.

3. The georeferenced trajectory estimation system of claim 1, the operations further comprising:
   obtaining submap or spatially indexed data, the estimated trajectory being generated using the submap or spatially indexed data.

4. The georeferenced trajectory estimation system of claim 1, the operations further comprising:
   running a localization system of a vehicle against the previously generated map to generate a map-aligned trajectory, the map-aligned trajectory to constrain the estimated trajectory.

5. The georeferenced trajectory estimation system of claim 4, the map-aligned trajectory comprising a plurality of map-aligned trajectory segments, the operations further comprising:
   running a sequential alignment algorithm from a start of a first map-aligned trajectory segment of the plurality of map-aligned trajectory segments backwards until a propagate pose has left the previously generated map; and
   running a GPS spline optimization which uses alignments resulting from the localization system and sequential alignment as fixed points in mapped areas and GPS plus inertial data and encoder data in the unmapped area.

6. The georeferenced trajectory estimation system of claim 1, the operations further:
   generating a map-aligned trajectory at least in part by using map data from the previously generated map to create at least one reference map, the map-aligned trajectory to constrain the estimated trajectory for the unmapped area.

7. The georeferenced trajectory estimation system of claim 1, the operations further comprising generating a map-aligned trajectory to constrain trajectories estimated for an unmapped area, the generating of the map-aligned trajectory comprising:
   running a localization system of a vehicle against the previously generated map; and
   running GPS spline optimization on results of running the localization system against the previously generated map.

8. The georeferenced trajectory estimation system of claim 7, the operations further comprising:
 generating the map-aligned trajectory by using multiple map build iterations where spline estimates are used in place of GPS trajectories in at least one map build iteration.

9. The georeferenced trajectory estimation system of claim 7, the operations further comprising:
 generating the map-aligned trajectory at least in part by running offline localization with GPS trajectory poses as initial guesses at seams of the unmapped area and an adjacent mapped area.

10. The georeferenced trajectory estimation system of claim 1, the operations further comprising:
 generating a set of fixed pose constraints at least in part by aligning the sensor data to the previously generated map in mapped areas, wherein a fixed pose constraint comprises a vehicle pose that should not be moved in an optimization that estimates a vehicle trajectory.

11. The georeferenced trajectory estimation system of claim 10, further comprising:
 running a localization system of a vehicle on intervals of trajectories that intersect the previously generated map to produce the set of fixed pose constraints;
 running GPS spline optimization on results of running the localization system against the previously generated map including the set of fixed pose constraints; and
 performing pose graph optimization and trajectory optimization using the set of fixed pose constraints.

12. A method of globally consistent vehicle trajectory mapping, the method being implemented by one or more processors and comprising:
 obtaining fixed reference points of a previously generated map;
 obtaining sensor data generated by vehicle sensors of at least one vehicle;
 identifying, from the sensor data, a set of sensor measurements for a geographic region taken by the at least one vehicle, the set of sensor measurements including environment geometry data for the geographic region and trajectory data for the at least one vehicle;
 generating an estimated trajectory for a first vehicle of the at least one vehicle, the estimated trajectory comprising a sequence of pose estimates referenced from at least one of the fixed reference points, at least a portion of the estimated trajectory being in an unmapped area outside the previously generated map;
 aligning the environment geometry data with the fixed reference points using the estimated trajectory;
 generating a map of the geographic region including the environment geometry data and the fixed reference points; and
 providing the map to an autonomous vehicle (AV) to control the AV according to the map.

13. The method of claim 12, wherein obtaining data generated by vehicle sensors of the at least one vehicle includes obtaining and aligning environmental geometry data and trajectory data captured during multiple passes of the geographic region by the at least one vehicle.

14. The method of claim 12, wherein obtaining data generated by vehicle sensors of the at least one vehicle includes obtaining submap or spatially indexed data, the estimated trajectory being generated using the submap or spatially indexed data.

15. The method of claim 12, further comprising running a localization system of a vehicle against a previously generated map to generate a map-aligned trajectory, the map-aligned trajectory to constrain the estimated trajectory.

16. The method of claim 12, further comprising generating a map-aligned trajectory for the unmapped area, at least in part by using map data from previously generated maps to create at least one reference map, the map-aligned trajectory to constrain the estimated trajectory.

17. The method of claim 16, the map-aligned trajectory comprising a plurality of map-aligned trajectory segments, further comprising:
 running a sequential alignment algorithm from a start of a first map-aligned trajectory segment of the plurality of map-aligned trajectory segments backwards until a propagate pose has left the previously generated map; and
 running a GPS spline optimization which uses alignments resulting from sequential alignment as fixed points in mapped areas and GPS plus inertial data and encoder data in the unmapped area.

18. The method of claim 12, further comprising generating a map-aligned trajectory to constrain trajectories estimated for an unmapped area the generating of the map-aligned trajectory comprising:
 running a localization system of a vehicle against the previously generated map; and
 running GPS spline optimization on results of running the localization system against the previously generated map.

19. The method of claim 18, further comprising generating the map-aligned trajectory at least in part by using multiple map build iterations where spline estimates are used in place of GPS trajectories in at least one map build iteration.

20. The method of claim 18, the generating of the map-aligned trajectory comprising running offline localization with GPS trajectory poses as initial guesses at seams of the unmapped area and an adjacent mapped area.

21. The method of claim 12, further comprising generating a set of fixed pose constraints at least in part by aligning the sensor data to the previously generated map in mapped areas, wherein a fixed pose constraint comprises a vehicle pose that should not be moved in an optimization that estimates a vehicle trajectory.

22. The method of claim 21, further comprising:
 running a localization system of a vehicle on intervals of trajectories that intersect the previously generated map to produce the set of fixed pose constraints;
 running GPS spline optimization on results of running the localization system against the previously generated map including the set of fixed pose constraints; and
 performing pose graph optimization and trajectory optimization using the set of fixed pose constraints.

* * * * *

UNITED STATES PATENT AND TRADEMARK OFFICE
CERTIFICATE OF CORRECTION

PATENT NO. : 11,237,004 B2
APPLICATION NO. : 16/366561
DATED : February 1, 2022
INVENTOR(S) : Prasser et al.

Page 1 of 1

It is certified that error appears in the above-identified patent and that said Letters Patent is hereby corrected as shown below:

In the Claims

In Column 28, Line 52, in Claim 6, delete "further:" and insert --further comprising:-- therefor In Column 30, Line 28, in Claim 18, after "area", insert --,--

Signed and Sealed this
Eighth Day of August, 2023

Katherine Kelly Vidal
*Director of the United States Patent and Trademark Office*